United States Patent [19]

Mundy

[11] Patent Number: 4,849,643

[45] Date of Patent: Jul. 18, 1989

[54] OPTICAL PROBE WITH OVERLAPPING DETECTION FIELDS

[75] Inventor: David J. Mundy, San Diego, Calif.

[73] Assignee: Eaton Leonard Technologies, Carlsbad, Calif.

[21] Appl. No.: 179,496

[22] Filed: Apr. 8, 1988

Related U.S. Application Data

[63] Continuation-in-part of Ser. No. 98,510, Sep. 18, 1987, abandoned.

[51] Int. Cl.$^4$ .................................................. G01N 21/86
[52] U.S. Cl. ...................................... 250/560; 256/376
[58] Field of Search .................... 250/560, 561; 356/1, 356/4, 376, 381, 384–387; 901/47

[56] References Cited

U.S. PATENT DOCUMENTS

| | | | |
|---|---|---|---|
| 3,529,169 | 9/1970 | Heaney et al. | 250/223 |
| 3,589,815 | 6/1971 | Hosterman | 356/167 |
| 3,615,139 | 10/1971 | Bostrom | 356/160 |
| 3,692,414 | 9/1972 | Hosterman et al. | 356/167 |
| 3,700,903 | 10/1972 | Adler et al. | 250/217 |
| 3,735,036 | 5/1973 | Macovski | 178/6.8 |
| 3,782,827 | 1/1974 | Nisenson | 356/120 |
| 3,806,253 | 4/1974 | Denton | 356/157 |
| 3,807,870 | 4/1974 | Kalman | 356/161 |
| 3,818,236 | 6/1974 | Lind et al. | 250/561 |
| 3,829,220 | 8/1974 | Parkinson | 356/160 |
| 3,866,038 | 2/1975 | Korth | 250/236 |
| 3,874,798 | 4/1975 | Antonsson et al. | 356/159 |
| 3,901,597 | 8/1975 | White | 356/4 |
| 3,975,102 | 8/1976 | Rosenfeld et al. | 356/167 |
| 4,105,925 | 8/1978 | Rossol et al. | 250/561 |
| 4,122,525 | 10/1978 | Eaton | 364/560 |
| 4,144,449 | 3/1979 | Funk et al. | 250/221 |
| 4,146,926 | 3/1979 | Clerget et al. | 364/556 |
| 4,158,507 | 6/1979 | Himmel | 356/376 |
| 4,171,917 | 10/1979 | Pirlet | 356/376 |
| 4,192,613 | 3/1980 | Hammar | 356/386 |
| 4,204,772 | 5/1980 | Balasubramanian | 356/376 |
| 4,208,589 | 6/1980 | Dashwood et al. | 250/560 |
| 4,259,013 | 3/1981 | Faxvog et al. | 356/237 |
| 4,290,698 | 9/1981 | Milana | 356/371 |
| 4,297,034 | 10/1981 | Ito et al. | 356/394 |
| 4,322,627 | 3/1982 | Pirlet | 250/561 |
| 4,326,804 | 4/1982 | Mossey | 356/375 |
| 4,339,664 | 7/1982 | Wiklund et al. | 250/577 |
| 4,348,114 | 9/1982 | Neale et al. | 356/431 |
| 4,349,274 | 9/1982 | Steele | 356/1 |
| 4,392,120 | 7/1983 | Mita et al. | 382/22 |
| 4,423,998 | 1/1984 | Inaba et al. | 414/730 |
| 4,440,496 | 4/1984 | Milana | 356/241 |
| 4,465,937 | 8/1984 | Forbes | 250/560 |
| 4,507,557 | 3/1985 | Tsikos | 250/341 |
| 4,555,633 | 11/1985 | Bjorkelund | 250/560 |
| 4,561,776 | 12/1985 | Pryor | 356/72 |
| 4,576,482 | 3/1986 | Pryor | 356/376 |
| 4,622,462 | 11/1986 | Eaton et al. | 250/236 |
| 4,710,760 | 12/1987 | Kasday | 340/712 |

FOREIGN PATENT DOCUMENTS

| | | |
|---|---|---|
| 1170179 | 12/1967 | United Kingdom . |
| 1328877 | 10/1970 | United Kingdom . |
| 1405331 | 1/1973 | United Kingdom . |
| 1495279 | 12/1974 | United Kingdom . |

*Primary Examiner*—David C. Nelms
*Attorney, Agent, or Firm*—Gausewitz, Carr & Rothenberg

[57] ABSTRACT

An optical probe for measuring various parameters of bent pipe comprises a substantially U-shaped housing defining a sensitive area across which light is projected from within the housing toward first and second light sensors mounted to the legs of the probe and having fields of view directed toward the inner portion of the probe. A pipe positioned within the sensitive area of the probe occludes sections of the fields of view of the sensors, which occluded sections have a direct relation to the position of the pipe with respect to the probe. Positions of the occluded sections of the fields of view defines the position of the pipe relative to the probe. By moving the probe in a scanning path along the pipe, a large number of measurements are made so that a best fit line will effectively average a large number of measurements to more accurately define three dimensional position and orientation of the pipe centerline.

53 Claims, 9 Drawing Sheets

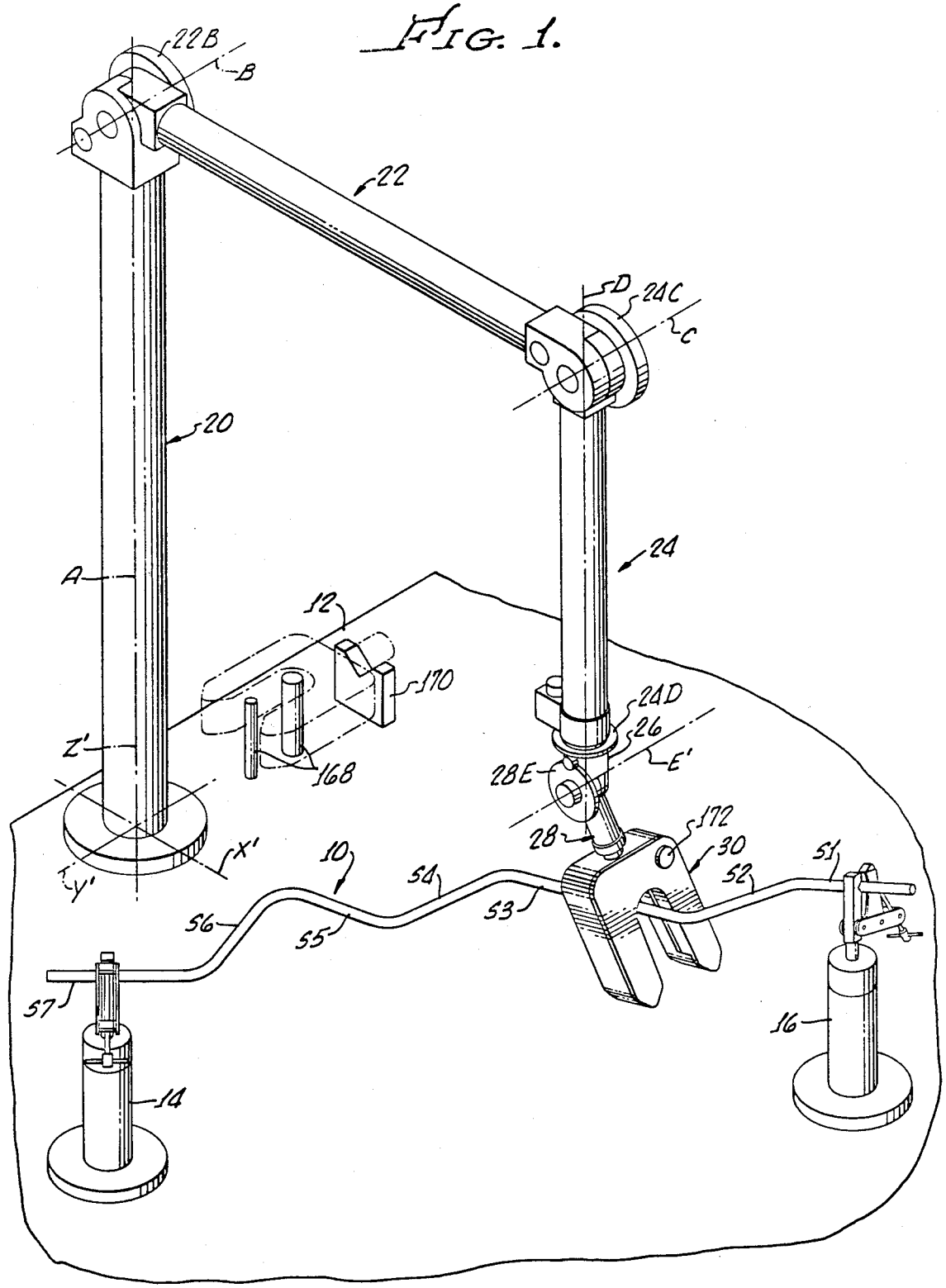

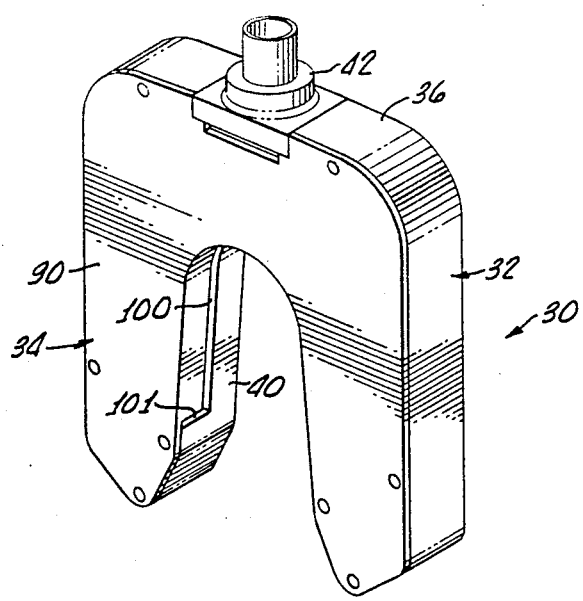
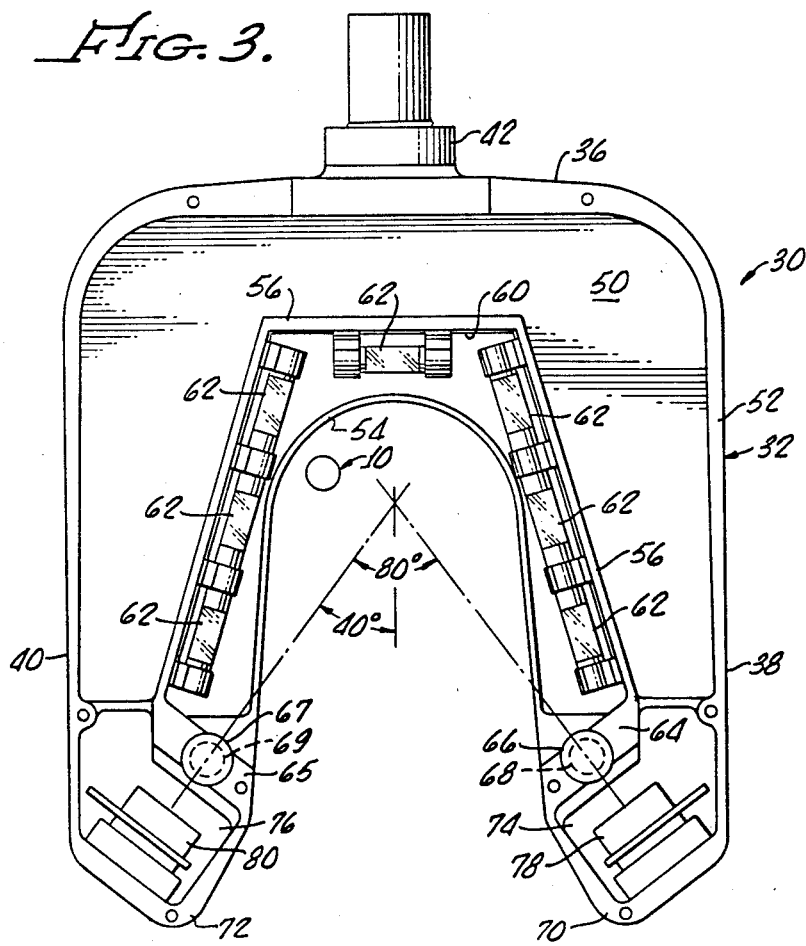
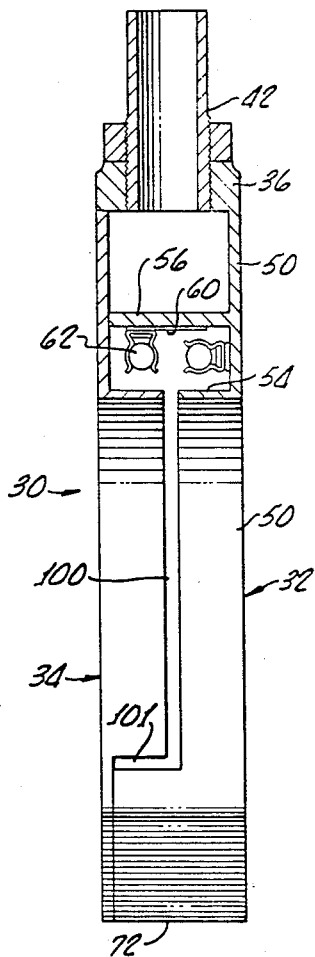

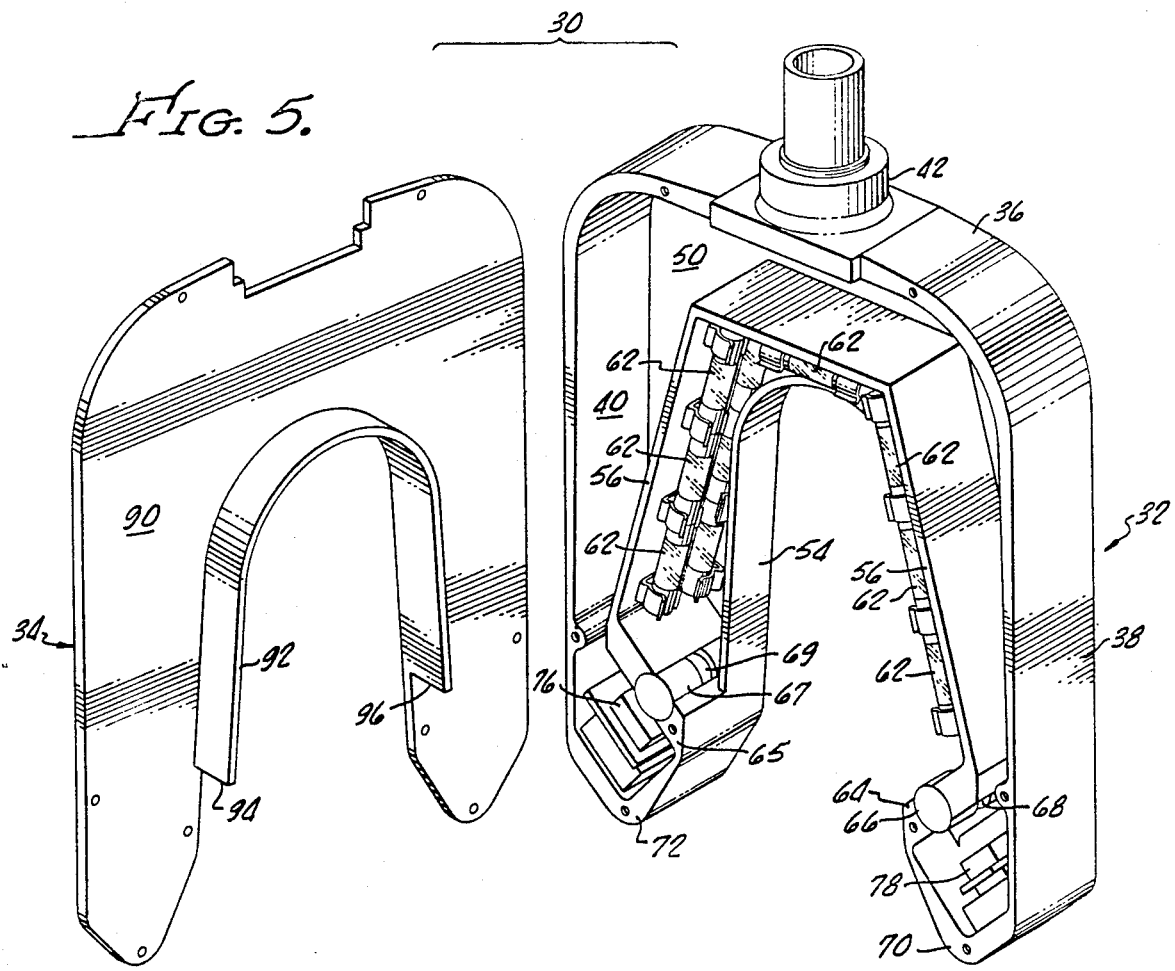

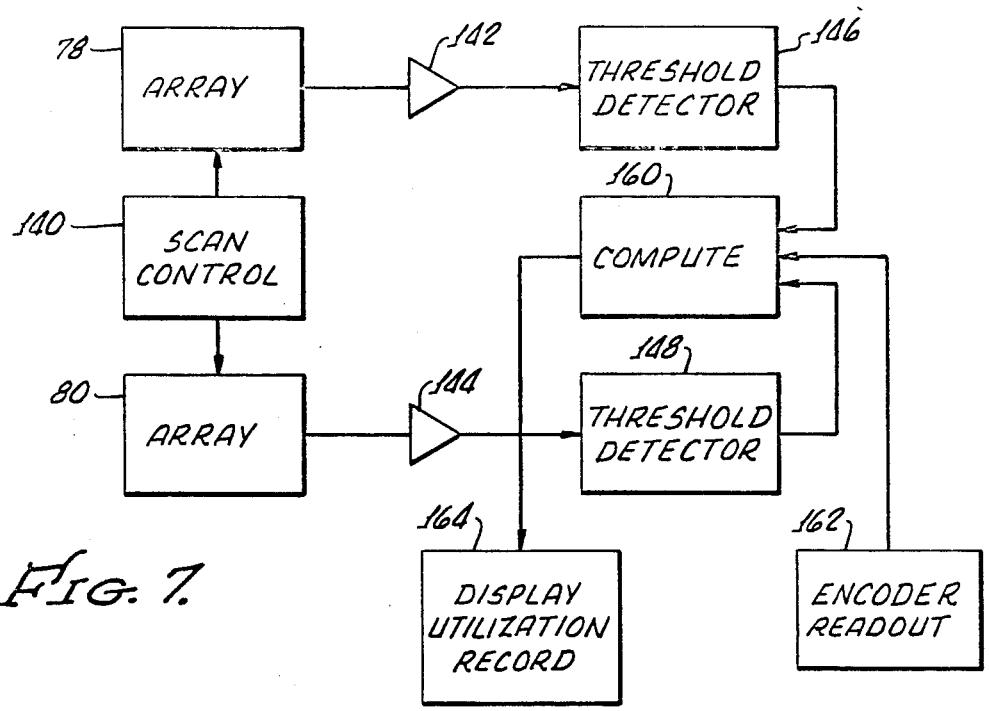
FIG. 7.
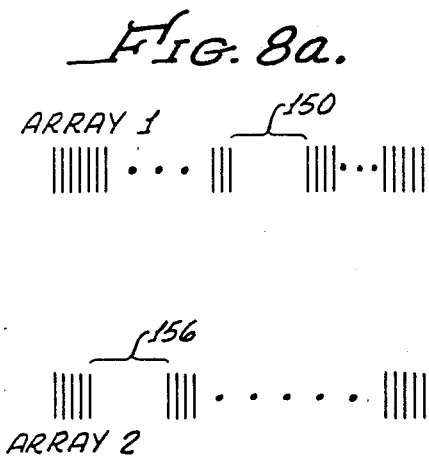
FIG. 8a.
FIG. 8b.
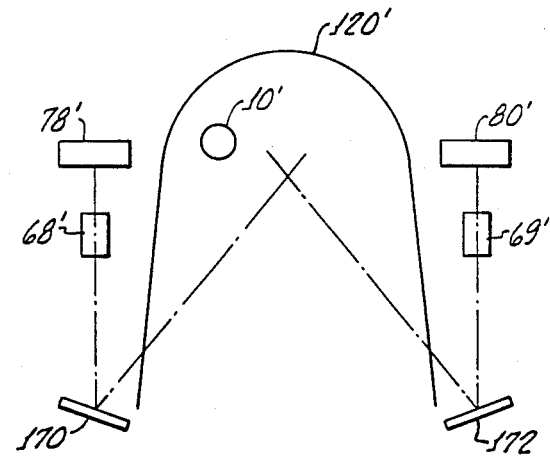
FIG. 9.

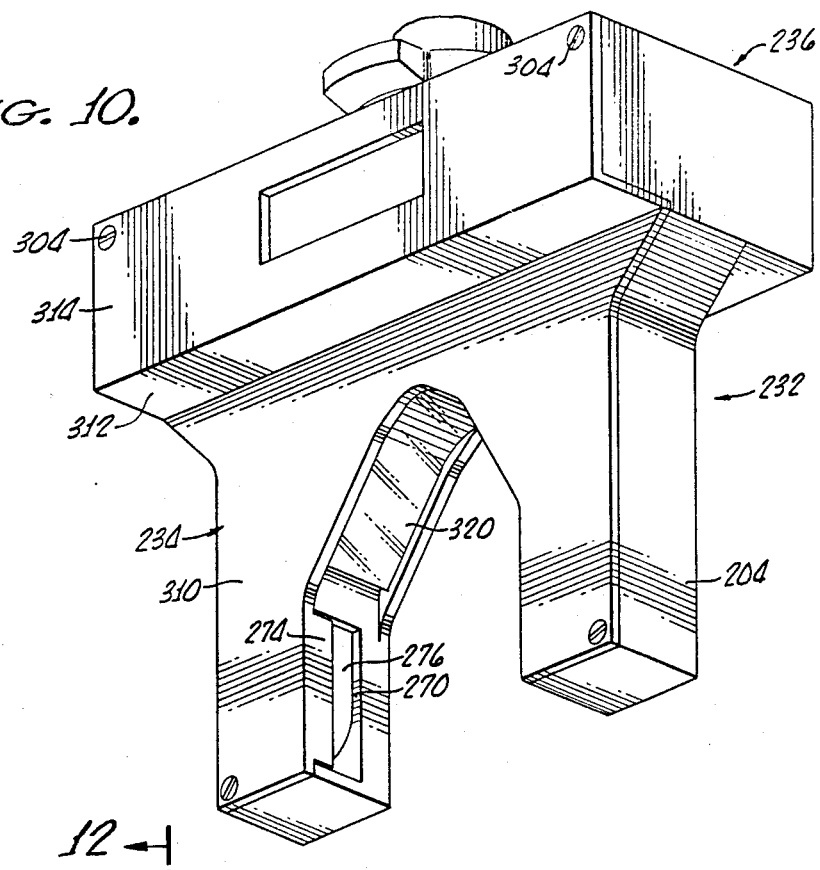
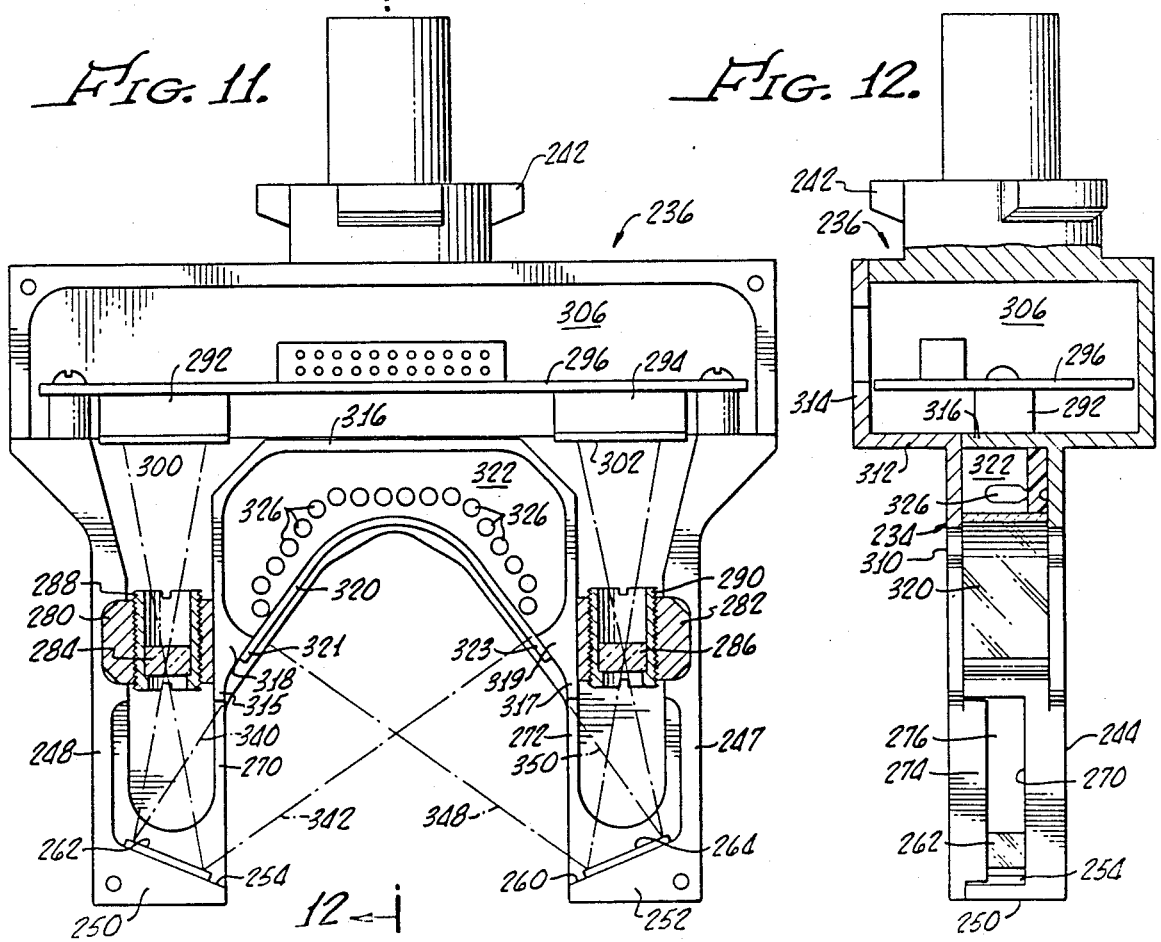

OPTICAL PROBE WITH OVERLAPPING DETECTION FIELDS

This application is a continuation-in-part of U.S. patent application Ser. No. 098,510, filed Sept. 18, 1987 for Optical Probe.

BACKGROUND OF THE INVENTION

The present invention relates to measuring instruments, and more particularly concerns measurements of the position of a pipe centerline. In U.S. Pat. No. 3,944,798, of Homer L. Eaton, there is disclosed a method and apparatus for measuring position and direction of a pipe centerline by use of a five axis articulated arm, bearing at the free end of the outermost arm a V-shaped working head or probe which may be moved to a number of diverse positions and orientations to contact a pipe upon which measurements are to be made. In general, for measurement of bent pipe, and for bending pipe, it is important to know various parameters, including the length of the pipe straight portions or distance between bends (DBB), the bend angle or degree of bend (DOB), and the plane of the bend angle or plane of bend (POB). By locating vectors lying along the centerlines of the pipe straight portions, the required parameters can be readily calculated. Thus, in order to obtain the necessary information or data to define a bent pipe and its several bends, it is only necessary to obtain data defining the position and orientation of the centerlines of the respective straight sections of the pipe. The position and direction of these vectors can be obtained either by measuring position of two points on each vector, thus defining the vector, or by use of the instrument of U.S. Pat. No. 3,944,798, which enables measurement of the direction of the vector by a single contact between the V-shaped working head and the exterior of the pipe.

The contact probe, or working head, of the pipe of the U.S. Pat. No. 3,944,798 has four contact elements which are positioned so that all of these elements will make electrical contact with the outer surface of the pipe, and thus signify obtaining of a desired relative position and orientation of the pipe centerline with respect to the working head. All of the electrical contact elements must contact the pipe, and thus some time and effort is involved in manipulation of the working head to ensure appropriate contact and appropriate orientation of the working head. This slows the making of the many measurements that are required for defining adequate data for a complete set of pipe bends.

Another problem with the contact probe of the Eaton patent is that the required contact between the probe and some slender, flexible pipes may result in distortion of the pipe, and thus create an erroneous reading of either pipe centerline position or direction. Therefore, in making measurements of very small diameter, slender and somewhat flexible pipes the contact probe of the prior art must be used at an even slower pace and with even greater degree of care to avoid distortion of the pipe by the necessary contact, and thus to avoid erroneous read out.

Accordingly, it is an object of the present invention to provide a pipe measuring probe which avoids or minimizes above-mentioned problems.

SUMMARY OF THE INVENTION

In carrying out principles of the present invention, in accordance with a preferred embodiment thereof, a working head includes first and second mutually spaced arrays of light sensitive elements having overlapping fields of view and a light source, spaced from the arrays and extending across at least a common portion of the fields of view, for illuminating both arrays. Both of the arrays have a section of their fields of view occluded by presence within the overlapping fields of an occluding object, such as a pipe, of which position is to be measured. Means responsive to the arrays are provided for generating a set of signals that collectively define position of an occluding object relative to the fields of view, and thus relative to the working head in a reference system that is fixedly related to the working head. In a particular embodiment, the working head is somewhat U-shaped, having a U-shaped slit or window for projecting light through a sensitive area between the legs of the working head toward first and second arrays of light sensitive elements mounted to receive light directed to the respective ends of the U-shaped head. A pipe positioned anywhere within the sensitive area of the head between the legs will occlude positions of the fields of view of the two arrays, whereby positions of the occluded portions of the field of view will define position of the pipe within the sensitive area of the working head.

BRIEF DESCRIPTION OF THE DRAWINGS

FIG. 1 is a perspective view of a five axis measuring instrument constructed in accordance with principles of the present invention;

FIG. 2 is a perspective view of the working head or optical probe of the instrument of FIG. 1;

FIG. 3 is a section taken through the working head;

FIG. 4 is a sectional view of the working head of FIG. 3;

FIG. 5 is an exploded view of the working head showing the cover plate displaced from the probe body;

FIG. 6 illustrates certain geometry useful in understanding operation of the probe of FIG. 2;

FIGS. 6a and 6b illustrate occlusion of the arrays;

FIG. 7 is a block diagram illustrating the read out of the sensor arrays;

FIGS. 8a and 8b show pulse trains obtained by scanning the arrays;

FIG. 9 schematically illustrates a modification of the structure and arrangement of the working head to provide a folded optical path;

FIG. 10 is a pictorial illustration of the structure of a probe including the concepts of FIG. 9;

FIG. 11 is a side view showing further details of the folded optical path probe of FIG. 10 with cover removed;

FIG. 12 is a section taken on line 12—12 of FIG. 11.

DETAILED DESCRIPTION OF THE INVENTION

Figure 13:
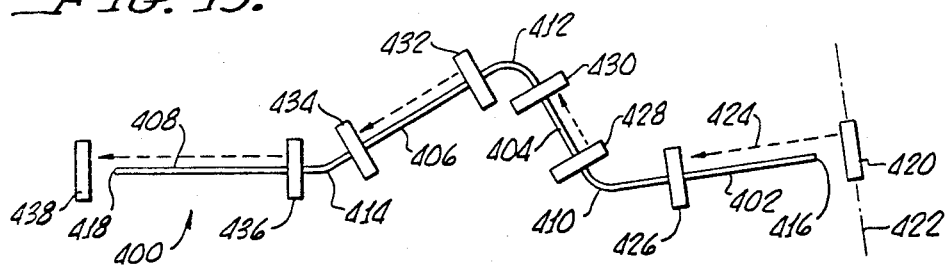
FIG. 13 illustrates a scanning method of employing the optical probe of the present invention.

The method and apparatus of the present invention are applicable to measurement of positions of various types of objects as may be required for positioning, locating parts and devices used in various assemblies to ensure proper operation. Measurement may be made of sample bent pipes for use in controlling digitally operated bending machines, and measurements may be made on completed pipe to determine accuracy of the bending operations actually carried out.

An important application of this invention is the measurement of a sample of bent tube for the purpose of deriving or correcting data to enable subsequent bending of other tubes conforming to the sample. Although the optical probe described herein may be employed with many different types and configurations of measuring instruments, whether employing linear motions, rotations or some combination of linear and rotational motion, it is described herein, solely for purposes of exposition, as carried by a five axis measuring instrument of the type shown in U.S. Pat. No. 3,944,798.

Referring to FIG. 1, a sample bent pipe 10 is fixedly mounted to a support or worktable 12 by means of a pair of clamps 14,16, which are detachably, but firmly, secured to any desired points on the table 12. Thus the tube 10 may be firmly mounted to the table in any one of a number of desired positions or orientations. For many purposes, including inspection and manufacturer, it is desired to measure significant parameters of the tube 10. These parameters include the lengths of each tube straight portion (distance between bends), the angle between adjacent straight portions (degree of bend), the plane of each of the bends (plane of bend), and the total length of the tube from end to end. These parameters, after correction for spring back and other factors, may be employed to calculate commands for an automatic tube bending machine, such as, for example, one of those shown in U.S. Pat. Nos. 4,063,041, 4,201,073 and 4,495,788, or may be fed to a computer to check accuracy of manufactured devices.

According to principles of the present invention, information for these calculations and measurements may be acquired accurately, rapidly, simply and without contact between the measuring instrument and the pipe by means of the five axis measuring instrument illustrated in FIG. 1 carrying the optical probe shown in the several drawings. Except for the different optical working head, the instrument shown in U.S. Pat. No. 3,944,798.

The measuring instrument of FIG. 1 comprises a first link 20 mounted upon table 12 for rotation about a first axis "A". A second link 22 is pivotally connected to the first link 20 for rotation about a second axis "B", which is normal to axis "A". A third link 24 is pivoted to the second link 22 for rotation about a third axis "C". Rotatably mounted within the third link 24 for rotation about a fourth axis "D" normal to axis "C" and coincident with the axis of the third link 24 is a fourth link 26. The fourth link 26 carries a fifth link 28 for rotation about a fifth axis "E", which is perpendicular to the fourth axis "D". Each of the second, third and fifth links has nearly 360° of rotation relative to its adjacent link. The first link 20 is capable of a full 360° of rotation with respect to the support table 12, and the fourth link is also capable of a full 360° of rotation with respect to the third link, whereby an instrument of relatively small dimensions is able to make measurements on objects of considerably greater dimensions.

Angle encoders 22B, 24C, 24D, 28E and a fifth encoder (not shown) on axis A are mounted to the articulated arm on respective ones of the five axes B, C, D, E and A for generating encoder signals representing the angular positions of the several links of the arm about their respective axes.

Carried in a fixed orientation relative to and by the fifth link 28 is the optical working head 30. As shown in FIG. 2, the working head 30 is formed of a substantially U-shaped housing, having a body section 32 and a cover section 34. The body section is formed with a bight section 36 connected to first and second mutually spaced leg sections 38,40 with a mounting collar 42 fixed to the body section for fixedly mounting the working head to the fifth link 28.

Generally the optical probe described herein has its working head formed with a light emitting portion and a light receiving portion, which is spaced from the light emitting portion to define a sensitive area between the two portions, the sensitive area being adapted to receive the pipe to be measured. On the light receiving portion are mounted first and second mutually spaced light sensors having mutually overlapping fields of view directed across the sensitive area toward the light emitting portion. A light source is mounted to the light emitting portion for projecting light across the sensitive area toward the light receiving portion. In particular, the light sensors each comprises a linear array of light sensitive diodes for receiving light from the light source and arranged so that portions of the arrays of diodes are occluded by a pipe positioned in the sensitive area. Means are provided for scanning the arrays to generate signals representing positions within the arrays of the occluded portions of the arrays.

As shown in FIGS. 3, 4 and 5, the body section of the probe 30 includes a flat outer back plate 50, having an upstanding U-shaped outer peripheral wall 52 and an upstanding somewhat U-shaped inner peripheral wall 54. Spaced inwardly of the inner wall 54 is an intermediate upstanding U-shaped wall 56, also fixed to the back plate 50, extending about and generally parallel to but spaced from the inner wall 54 to provide a light bulb mounting area. Fixedly secured to the back plate 50 and to intermediate wall 56 between the intermediate wall 56 and inner wall 54 are a number of small diameter elongated light bulbs 62. A similar group of bulbs is mounted to the back plate 50. Secured to the intermediate upstanding wall 56, and extending along substantially its entire length from one end thereof to the other, between the two rows of light bulbs, is a light diffusing reflective strip of light colored material 60 (FIGS. 3 and 4). The forward ends of the inner wall 54 and intermediate wall 56, closest to the free ends of the probe, are interconnected by integral lens mounting walls 64,65, at each leg of the probe, in which are mounted cylindrical lens carriers 66,67, each carrying a lens 68,69 at an inner portion thereof. Lens mounting wall 64 cooperates with the inner and outer walls 52,54, which merge at the free ends 70,72 of the legs of the housing body section, to form sensor array compartments 74,76. In the compartments 74,76 are mounted light sensor arrays 78,80, formed of linear arrays of light sensitive diodes. Each sensor is a standard device, such as, for example, EG&G Reticon Model RL0512G, array of 1 by 512 light sensitive diodes mounted in close proximity to one another to provide a total length of about one-half inch.

Each lens is a conventional device that focuses received light on the associated array of diodes.

The housing cover 34 is essentially a generally U-shaped flat plate 90, having apertures for receiving fasteners by which the cover is secured to the body, and having an inner substantially U-shaped continuous wall 92 upstanding from the plate 90 and extending from one end portion 94 of the cover plate wall adjacent the sensor array compartment on one of the housing body legs to a second end 96 at the other end of wall 92 adjacent the end of the other leg of the housing section. With the cover plate 34 mounted on and fixed to the body section 32, there is a continuous substantially U-shaped slot or window 100 (FIGS. 2 and 4) formed in the probe housing, running continuously from the end portion of one of the housing legs, across the housing bight and down to an area adjacent the end of the other housing leg. Slot 100 ends at each of the housing ends adjacent the respective sensor compartments in an angled section 101 through which the lenses receive light from the respective fields of view. As can be seen in FIG. 4, the slot 100 is positioned in the plane of centerline of the reflective strip 60, displaced from and positioned between the planes of the two rows of bulbs of the housing section body.

With the housing cover fixed to the housing body, as by suitable fasteners, to provide the assembled probe shown in FIGS. 2 and 4, there is provided a self-contained optical measuring unit, including a pair of linear arrays of light sensitive elements and an opposing linear light source having a wide projected beam, all extending in or close to a common plane of substantial symmetry of the probe. This plane of symmetry of the probe is a plane bisecting the probe housing and extending substantially parallel to the major flat surfaces of the cover plate 90 and housing body 50. The housing section walls 54 of the body and 92 of the cover shield the diode arrays from light transmitted directly from the light bulbs so as to ensure a diffused, more evenly distributed, wide beam of light across the fields of view of the two diode arrays.

Mounted within the housing body section 32, between the body section and the cover, are electrical circuits (not shown), which include input clock circuits for scanning the diode arrays for their read out and output conditioning and shaping circuits.

FIG. 6 is a sketch illustrating geometry useful in explaining operation of the described probe. The linear arrays shown at 78 and 80 are positioned at a fixed distance from one another and joined by a line extending along or parallel to the Y axis of an X,Y reference system fixedly related to the probe. The X axis of the reference system may be taken as a perpendicular bisector of the line extending along the Y axis between the array centerlines. Each diode array has a field of view, through its respective lens, centered along a respective one of optical axes 110,112. In a presently preferred embodiment, axes 110,112 intersect at point 114 at an included angle of about 80°. The field of view of each of the arrays 78,80 is approximately 45°, centered upon its respective optical axis. The included angle of the linear arrays and relation of their optical axes and fields of view are chosen so as to maximize the amount of overlap of the two fields of view. FIG. 6 illustrates the somewhat horseshoe shaped linear light source as a horseshoe shaped line of diffused light 120 emanating from the slit 100 in the housing and directing light toward the respective diode arrays 78,80. The linear light source 120 is fixedly positioned and spaced from the diode arrays to define the sensitive area between the light emitting portion of the s working head and its light receiving portion.

Also illustrated in FIG. 6 is a section of the pipe or rod 10 that extends through the probe between its legs. A line between the centerline of pipe 10 and the center of array 78 extends at an angle A1 to the optical axis 110 of the field of view of array 78. A line between the centerline of the pipe and the center of array 80 extends at an angle A2, to the optical axis 112 of the field of view of this linear array. Knowing the angles A1 and A2 and the length of the line between the centers of the lenses, the position of the lenses relative to the Y axis, and the positions of the diode arrays, the position of the centerline of pipe 10 in the X,Y coordinate system, which is fixedly related to the working head, can be readily calculated.

An image of the effectively linear light source 120 is projected by the respective lenses on all of the elements of each of the arrays 78,80. Thus light is received by all array elements except those elements which are occluded by presence of a pipe being measured. This is illustrated in FIGS. 6a and 6b, which schematically show images projected by the lenses on arrays 122 and 124 of the light sensitive diodes. Groups of elements 126 and 128 respectively are occluded at the dark sections of the image of the light source. Centerlines of the occluded groups are located at distances 130 and 132 respectively from the respective centerlines of the arrays 122,124. The distances 128 and 132 between the centerlines of the occluded sections and the centerlines of the array are directed proportional respectively to the angles A1 and A2. Thus, by conventional scanning techniques to sequentially read out individual ones of the light sensitive diode signals, the position of the center of a group of occluded array elements can be readily determined and used to compute position of the centerline of pipe 10 in the coordinate system X,Y.

Illustrated in FIG. 7 is a functional block diagram that broadly shows electronics involved in the described probe. The signals emitted by each of the diodes of the respective arrays 78,80 are sequentially read out one by one under control of clock signals from a scan control circuit 140 and fed via signal conditioning amplifiers 142,144 to threshold detectors 146 and 148 respectively, which thus provide a series of evenly spaced pulses, such as shown in FIGS. 8a and 8b. The series of pulses each has a gap, as indicated by gaps 150 and 156 respectively, caused by the presence of the occluding pipe. Output signals from those diodes of the array positioned at a dark section of the image are too small to pass the threshold detectors, which thus provide pulse trains in which pulses are absent at positions directly corresponding to the occluded sections of the image. The pulse trains from the threshold detectors 146 and 148 are fed to a computer, generally indicated at 160, which also receives angle information from the several encoders, collectively indicated at 162 in FIG. 7, mounted to the articulated arm of FIG. 1 so as to provide output signals respectively representing rotation of the individual elements or links of the articulated arm about the respective axes A,B,C,D and E. The angle position information from the encoders, together with the pulse train from the diode arrays is employed to compute the position of the centerline of the occluding pipe 10 with respect to a coordinate system X', Y', Z' (FIG. 1) fixedly related to the worktable 12. The output of computer 160 is fed to a suitable display, utilization or recording apparatus 164 for use in developing or correcting bending control programs or simply recording the measurements made. Computations based upon the five angle readouts are described in U.S. Pat. No. 3,944,798.

Portions of the circuitry functionally illustrated in FIG. 7, including the scan control 140, conditioning amplifiers 142,144 and threshold detectors 146,148, together with appropriate control circuitry not illustrated, may be mounted within the probe housing, on plate 50, to provide sets of signals to the computer 160. These signals, together with the signals representing articulation angles of the several links 20, 22, 24, 26 and 28, collectively define position of a point on the centerline of the pipe with respect to the selected coordinate system on the worktable. Power to the light bulbs and sensor scanning circuit, and signals from the sensor arrays and conditioning circuits is transmitted to and received from the interior of the probe housing by means of a multi-conductor cable (not shown) extending from the probe body.

A pair of vertical cylindrical rods 168 is fixed to worktable 12 (FIG. 1) in a known position adjacent a probe calibration support 170, also fixed to the worktable, for use in calibration of the probe readout.

In use of the probe, the working head is first moved to position the calibration rods 168 within the probe sensitive area. The probe sensitive area is a generally circular area, having a diameter equal to or substantially equal to the diameter of the curved housing bight, and positioned with its periphery contiguous to the inner surface of the probe housing sections. In other words, assuming the bight of the probe to be a circular arc, the probe sensitive area is a short right circular cylindrical section, having an axis normal to the plane of symmetry of the probe and having a circular cross section a portion of the periphery of which is coincident with the circular surface of the bight of the U-shaped probe. The pipe to be measured may be positioned anywhere within this sensitive area. A tube positioned at any location within the sensitive area will occlude a portion of the image of the field of view of both of the sensor arrays, and thus the angles A1 and A2 may be measured for a pipe positioned anywhere within the probe sensitive area.

Having calibrated the probe by adjusting the relation between measured angles A1 and A2 and the known position of reference rod 170, the probe is now moved toward a free end of a pipe that is clamped to the worktable with clamps 14,16. The probe is moved so that a first straight portion, such as straight S1 of the pipe 10, intersects the plane of symmetry of the probe, extending through the probe sensitive area. A manually operated switch (not shown) operable by a button 172 on the probe body may be pressed by the operator to trigger the scanning of the array for read out of pulses defining position of the occluded array area, and for simultaneous readout of angular position signals from the encoders. Signals from the several angle encoders collectively define the probe position relative to the worktable in a reference coordinate system fixed thereto. Signals from the probe scanning circuits collectively define positions of a point on the centerline relative to the probe. Readout is triggered with the probe positioned over two mutually spaced points along the straight S1, thereby defining the three dimensional coordinates X,Y,Z of each of two points on the centerline of straight S1 and thus producing sets of electrical signals that collectively define the vector of the centerline. The probe is then moved to cause two different portions of the second straight S2 to extend through the probe sensitive area, and measurements of occluded areas of the probe arrays and angular positions of the links are made at each of these two points. This procedure is continued with two measurements being made on each of the following straight portions, S3, S4, S5, S6 and S7, so that the centerlines of all straights have been measured, and the vectors of such centerlines in the desired coordinate system are computed.

This non-contact optical probe, which does not require contact between any part of the probe and the pipe section being measured, also does not require any particular positioning or orientation of the pipe with respect to the probe or the plane of symmetry of the probe, within a wide range of relative positions and orientations. Of course the probe must be roughly oriented so as to straddle the pipe being measured. Thus the pipe 10 may be located at any point within the probe sensitive area, such location being limited solely by the fact that it must cause the pipe to occlude some of the elements of both of the diode arrays. Moreover, the extent of the light source and common fields of view of the arrays are such that this sensitive area is maximized, whereby positioning of a pipe to be measured substantially anywhere within the probe between its legs, inwardly of the ends of the legs, is effective to accomplish measurement. Further, the direction of the centerline of the pipe straight being measured need not be perpendicular to the plane of symmetry (the plane which is parallel to and between both of the housing section plates 50 and 90). The pipe centerline can extend at substantially any angle to such a plane, as long as the pipe penetrates the common plane containing the axes 110,112 of the fields of view and of the line light source 120 that is projected through the probe slot 100.

In a presently constructed probe the distance between the centerlines of the arrays is about 3.2 inches, and the distance from the line between the array centerlines and the intersection of their optical axes is about 2.3 inches. A probe of these general dimensions having a sensitive area of about two and one-half inches in diameter is useful for measuring of pipes with diameters from one eighth inch to up to a maximum of two and one-half inches. For measurement of pipes of greater diameters, a probe of larger dimensions would be constructed.

The described probe employs a 10 mm focal length lens for each of the diode arrays. The focal length of the lens is constrained by the limited length of the optical path between the array and the occluding pipe within the sensitive area of the probe. To enable use of improved optics having a longer focal length, and thus obtain an optical system that is less subject to error at edges of its field of view, the optical path length between the pipe being measured and the light sensitive diode array may be significantly increased in the manner illustrated in FIG. 9. As shown in FIG. 9, optics are provided to form a folded light path between an object, such as a pipe 10', in the sensitive area of the probe, and the diode arrays 78' and 80', which in this case are mounted to the legs of the probe housing at a distance from the leg ends. At the ends of the legs are mounted mirrors 170,172, which reflect light from the linear light source 120' (which is the same as in the embodiment of FIGS. 1 through 8) to the respective diode arrays 78', 80'. In this arrangement an improved lens of longer focal length, such as lenses 68',69' may be mounted to the housing between the mirrors and the diode arrays in the longer optical paths provided in this arrangement. The longer focal length lens gives better linearity over the length of the array, has less distortion at the ends of the array and also affords a wider field of view.

Illustrated in FIGS. 10, 11 and 12 is an exemplary mechanization of the probe with folded optical path that is shown in FIG. 9. The folded optical path probe of FIG. 10 is substantially U-shaped and comprises a body section 232 and a cover section 234. The body and cover sections are formed with leg sections 238,240 interconnected at their rearmost ends by a substantially rectangular back or bight section 236. As can be seen in FIGS. 10 and 12, the bight section is deeper than the depths of the probe legs, extending outwardly of the plane of the legs to provide increased interior space for packaging of electronic circuitry required for operation of the probe. A mounting collar 242 is fixedly attached to the bight section for mounting of the probe body to the articulated arm linkage as previously described in connection with the probe of FIGS. 1 through 4.

The probe legs include bottom plates 244 and upstanding outer walls 247,248 which terminate in front wall portions 250,252, having inclined surfaces 254,260 which mount reflective mirrors 262,264.

Each leg section has a relatively low upstanding inner wall 270,272 which is laterally spaced from an inwardly extending leg, such as leg 274 on the cover 234. Leg 274 projects toward wall 270 but is spaced therefrom to provide a large, elongated rectangular light receiving window 276 on the inner side of and extending for a major portion of the length of each probe leg.

Lens housings 280,282 are fixedly mounted to the body section leg portions intermediate the front and rear of the legs portions and carry lenses 284,286 in adjustable screw mounts 288,290. Sensor bodies 292,294 are carried on an electronics board 296 that is fixedly mounted in the interior of the rectangular bight section 236. The sensor bodies include linear arrays of diodes 300,302 that are centrally positioned in alignment with the optical axis of the lenses 284,286 for reception of light reflected through the lenses from mirrors 262, 264, that are fixedly mounted on inclined surfaces 254,260 at the free end of the leg portions.

Cover 234 includes an intermediate flat section 310 that extends to the bight section and then extends outwardly via a connecting section 312 to a rear section 314 of the cover which extends along and rearwardly over the bight section to close the interior of the bight section. The cover is fixed to the body section by any suitable means, such as screws or bolts 304.

Extending along an intermediate portion of the bight section of the probe body and along rear portions of inner sides of the legs is an upstanding, substantially U-shaped inner wall 316 that separates an electronics chamber 306 within the interior of the bight section from a light source chamber 322 formed in a forward portion thereof and positioned between the rearmost portions of the legs. A translucent diffusing plate 320 closes the forward portion of the light source chamber. The latter is defined between the cover plate, U-shaped inner wall 316, the back plate 244 of the housing section and the diffusing plate itself. Mounted within the light source chamber 322 are a plurality of light bulbs 326 arrayed in a curved path around the curve of the diffusing plate.

The forward ends 315,317 of inner wall 316 are curved to extend inwardly and rearwardly, as indicated at 318,319, to form supports to which the forward ends 321,323 of the diffuser plate are fixedly attached.

The arrangement illustrated in FIGS. 10, 11 and 12 provides a compact probe with a greatly increased optical path length, the optical path being folded by the mirrors 262, 264, and enables the use of lenses of increased focal length with the attendant advantages thereof. The probe of FIGS. 10 through 12 is used in the same manner as the probe previously described.

In a particular embodiment the probes dimensions are such that the distance between inner surfaces of the free ends of the legs is about two and a quarter inches, and the distance from a line joining the center of the mirrors 262, 264 to a line tangent to the curved mid-section of diffuser plate 320 is about two and one eighth inches. The linear diode arrays 300,302 are aligned with one another and lie in the same plane. 3 They are spaced apart at center-to-center distances of about three inches in the exemplary probe head of FIGS. 10 through 12. The probe head provides a sensitive area that is a circular area substantially concentric with a circle which has a portion coinciding with the center portion of the diffuser plate 320. In a probe of these dimensions, the sensitive area may be approximately one and one-eighth inches in diameter. The arrangement is such that a wide beam of light having a width indicated by lines 340,342 is received by the mirror 262 from the light source within the light chamber 322 and reflected through lens 284 for focusing upon the diode array 300. Similarly, a wide light beam indicated by lines 348,350 is received from the light source by the mirror 264 and reflected through the lens 298 which focuses the beam upon the plane of diode array 302. These wide beams are received by the relatively large windows 276 in the leg sections, each window extending substantially from a free end of the leg section for a major portion of the length of the leg section. The enlarged receiving window permits use of a large sensitive area and an increased length of the optical path. A probe of these general dimensions having a sensitive area of about one and one eighth inches in diameter is useful for measuring pipes with diameters from about 0.05 inch up to a maximum of about one inch.

If deemed necessary or desirable, for increased accuracy of location of the pipe centerline within the probe sensitive area of the probe disclosed herein, additional sensor arrays, such as third and fourth or more diode arrays (not shown), may be suitably mounted so as to provide essentially redundant position measurements of the pipe centerline. Thus, for example, with use of three sensor arrays, one array may be paired s with each of the other two to provide two redundant sets of measurements. With use of four diode arrays, each diode array may be paired with each of the other three arrays, providing a total of six measurements, which may be made independently of each other and averaged to provide a more accurate final measurement.

Although a U-shaped probe is disclosed herein and has been implemented in a presently preferred embodiment of the described invention, it will be readily appreciated that other shapes of the probe can be employed to provide a self-contained probe having a built in light source providing a wide line of light traversing the fields of view of two mutually angulated diode arrays mounted on the probe and defining there between a sensitive area in which may be positioned an occluding pipe to be measured.

In the described arrangements the diode arrays look inward toward the light source mounted on the probe. It is also contemplated that the diode arrays may be mounted on the probe to look outward from the probe toward a more remote, broader and more extensive light source, fixedly mounted in some relation to the worktable, or otherwise mounted on a structure other than the probe. Such a light source would send a broad field of light to, over and past the pipe to be measured toward the probe light sensitive arrays. The probe arrays would then be positioned on the side of he pipe to be measured opposite the light source, so that the pipe would occlude sections of both of the arrays, just as previously described.

A significant advantage of the self-contained light source positioned so as to illuminate both diode arrays, as illustrated in the drawings, is the fact that regardless of the manner of manipulation of the probe, its position or orientation, the light source will at all times illuminate both diode arrays.

As described above, the measuring instrument with the disclosed optical probe is utilized to measure a single point on the centerline of a pipe merely by placing the pipe in the probe sensitive area and reading out encoder angles and probe optical data. The vector, or direction of the centerline of the pipe, is defined by making a measurement of each of two spaced points along a pipe straight and employing measurement data of the two points to calculate the centerline vector. However, where it is desired to obtain the direction of the centerline, that is, to define the vector of the centerline of the pipe, a substantial improvement in accuracy of the resulting data can be obtained by employing any one of the above described probes in a scanning mode. In such a scanning mode a large number of measurements are made at different points on each straight portion of the pipe, and these points are effectively averaged to determine the centerline. Actually, according to this scanning mode, after reading sets of raw data, each of which set collectively defines one point on the centerline of the probe, a "best fit" line is determined. Then points at the ends of a scanned group of points on a given straight are transferred to the best fit line to thereby define the desired vector.

By use of this scanning mode, most random errors of the instrument are effectively eliminated and, importantly, measurement errors due to irregularities of the pipe itself, such as surface roughness, diameter variations, kinks or other distortions, are also effectively eliminated. Accordingly, precision of the instrument is significantly improved.

FIG. 13 is a diagrammatic illustration that explains the nature of the scanning mode of use of this optical probe. FIG. 13 shows a pipe 400 having straight portions 402, 404, 406, 408 interconnected by bends 410, 412, and 414 and having pipe ends 416 and 418. The drawing also depicts (by simple rectangles) a number of different positions of a single optical probe as it moves through this scanning mode. Thus, initially, the probe, which is schematically depicted at 420 in a beginning position, is placed outwardly of the first end 416 of the pipe but preferably with the probe positioned so that the prolonged centerline of the pipe extends through a point in the sensitive area of the probe. The probe is then moved toward the pipe end 416 (preferably in a direction generally parallel to the first pipe section centerline). When the probe is at or nearly at the first end 416, that is, when the first pipe end enters or is about to enter the probe sensitive area between the probe legs, the arming button 172 (FIG. 1) on the probe is depressed to begin read out of encoders and probe optical data. The angular orientation of the probe with respect to the pipe centerline during the subsequent course of its scan path is not particularly critical and can vary widely. However, it is more important that the probe plane of symmetry, as indicated by the dot-dash line 422 in FIG. 13, be close to a perpendicular to the axis of the pipe straight 402 when the probe is at the pipe end 416. This orientation helps to minimize the possibility of erroneous measurements on the pipe end. The probe is not stopped at the pipe end 416 but is moved in a scanning path along the pipe axis in a continuous, steady motion, preferably but not necessarily at a constant speed. The arming button is held down at all times during the portion of the scan motion at which it is desired to enable readout of the encoders and probe data. The scan motion is continuous in the direction indicated by arrow 424 to a position indicated at 426, which is adjacent to but short of the first bend 410. Thus the probe has traversed a scan path from beyond the first end of the pipe across the first end to a point adjacent the next bend. During this scan, successive portions of the pipe pass through the probe sensitive area, and both the angle encoders and diode array scanning circuits provide outputs, as will be described below. Effectively, during this scan from position 420 to position 426, a large number of measurements of the pipe centerline are made, such measurements being made repetitively at selected intervals, such as every ten milliseconds for example.

Having reached the probe position indicated at 426, the arming button is released and the probe moved to a start position for the next straight 404, the start position being indicated at 428 and being adjacent bend 410. The arming button is depressed and the probe is moved in a continuous scan path along the length of the straight 404 (preferably, but not necessarily being moved parallel to the pipe section centerline), just as described in connection with the first straight 402, until a position indicated at 430 adjacent the next bend 412 is reached. At this position the arming button is released and the probe is moved across the bend 412 to the starting position 432 of the third straight 406. With the arming button depressed, the probe once again is moved through a scan path nearly parallel to the centerline of the straight, to a point adjacent the next bend 414, as indicated by probe position 434, at which point the arming button is released. The probe is then moved to position 436 for start of the scan of the final straight 408, and, with the arming button depressed, moved along the straight past the second end 418 of the pipe to the final position 438, which may be just past the final end 418. The arming button is then released, and a complete set of measurements has been accomplished. During scanning motion of each straight the pipe is caused to move through the probe sensitive area.

Effectively, for each straight portion of the pipe, a large number of sets of encoder angle data and probe optical data are collected at spaced intervals along the length of the pipe. These encoder angle data are sets of probe position signals that collectively define three dimensional position of the probe in a selected coordinate system. The probe optical data are pipe position signals that collectively define three dimensional position of a point on the pipe centerline relative to the probe itself. The raw encoder and probe data are stored, and at the end of a measurement all the raw data is converted into X,Y,Z coordinates that identify a collection of, for example, between ten and one thousand measured points on the centerlines of the respective pipe straights in a reference coordinate system having a known relation to the instrument support table. For each collection of points, a best fit line is determined and used as the vector of the pipe straight centerline. Preferably there are at least one hundred points in the collection of measured points and a suitable number, such as fifty, for example, are selected for determination of a best fit line.

Figure 14:
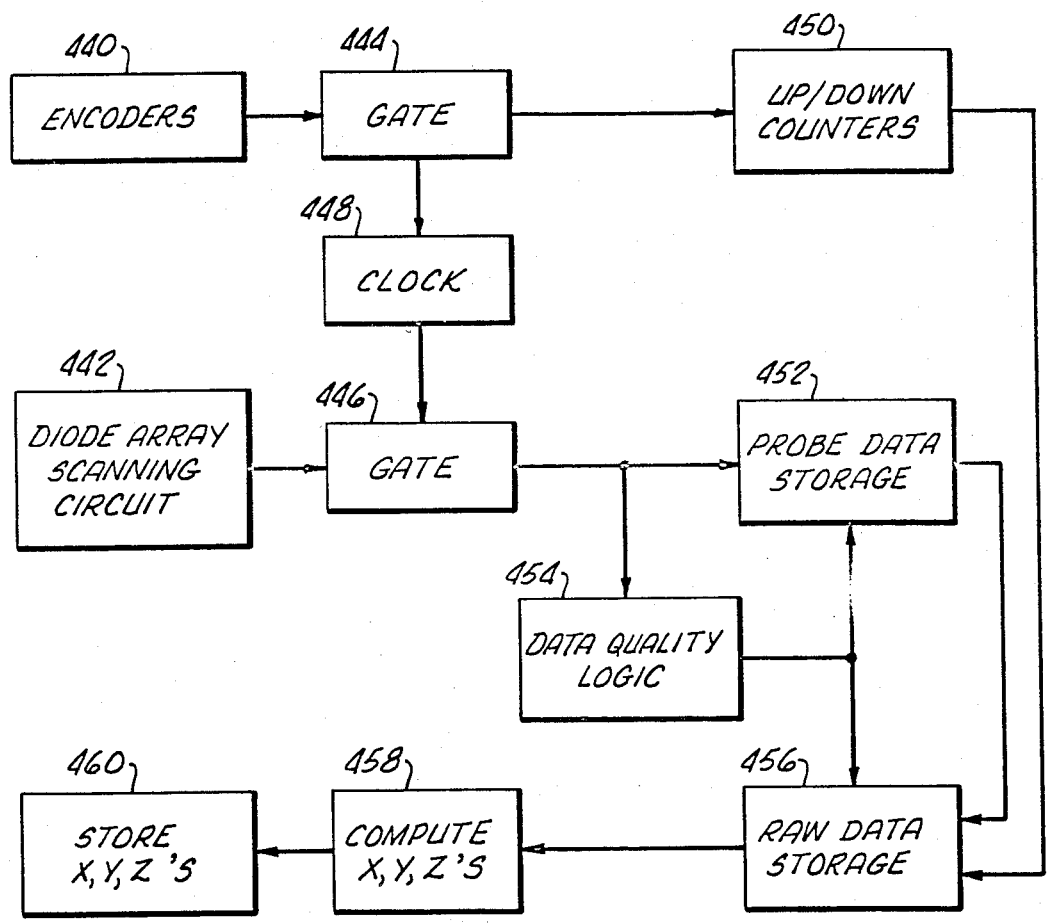
FIG. 14 is a simplified functional block diagram illustrating collection and storage of raw data from the encoders and probe for using the probe in a scanning mode.

FIG. 14 is a functional block diagram illustrating portions of the electronic readout and raw data storage involved in the above-described probe scan mode. Encoders, collectively indicated at 440 in FIG. 14 (and shown at 22B-22E in FIG. 1), and the optical probe diode array scanning circuitry, indicated at 442, provide information every ten milliseconds via gates 444,446 under control of a clock 448 that provides a gating pulse at suitable selected intervals, such as every ten milliseconds, for example. The encoder pulse data are fed to trigger a set of up/down counters 450, which thus contain a readout of the angle measured by the respective encoders. The diode array scanning data are fed through the gate 446 to probe data storage 452. Data from the diode array scanning circuit are fed to a quality logic circuit 454, which analyzes the raw data from the scanning circuit of the diode array to determine whether or not a pipe has been positioned within the sensitive area of the probe so as to provide a shadow or occlusion on both of the probe arrays. Effectively the logic circuit 454 determines whether or not all diodes of both arrays have been illuminated. If all the diodes receive illumination, then there is no occlusion, and there is no acceptable optical data signal. If the scans of both arrays show a pair of transitions of pulses read from the diodes of each array, one such transition going from light to dark, and the next going from dark to light, it is known that a finite area of the array has been occluded. If both arrays are occluded, it is determined that the data quality is acceptable.

The diode array scanning data or probe optical data, is stored in storage device 452 under control of the quality logic 454 if, and only if, the data is determined to be acceptable. Data from counters 450 and probe data storage 452 are fed to a raw data storage device 456, also under control of a signal from the data quality logic 454. Raw data is stored only if data quality is acceptable. After having stored raw data from all the points of the scan of a single straight, the raw data is fed to a computing circuit 458, which computes the three dimensional coordinate positions, the X, Y Z coordinates of each of the points for which data is contained in raw data storage 456, and these coordinates are stored as an array of point coordinates in a further storage device 460.

Figure 15A:
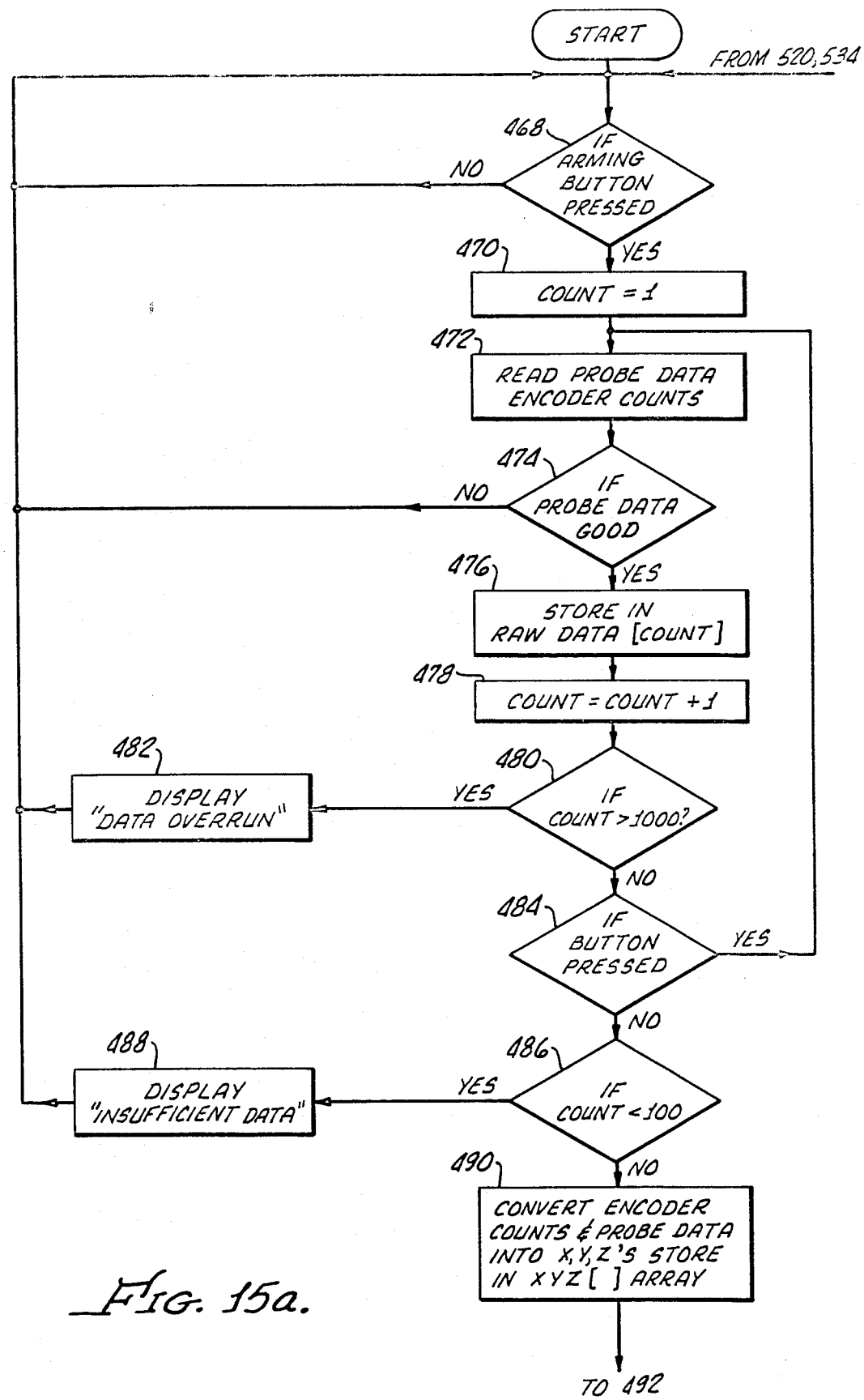
FIGS. 15a, 15b and 15c collectively comprise a flow chart of operations performed in a digital computer program that carries out the scanning mode of the described probe.
Figure 15B:
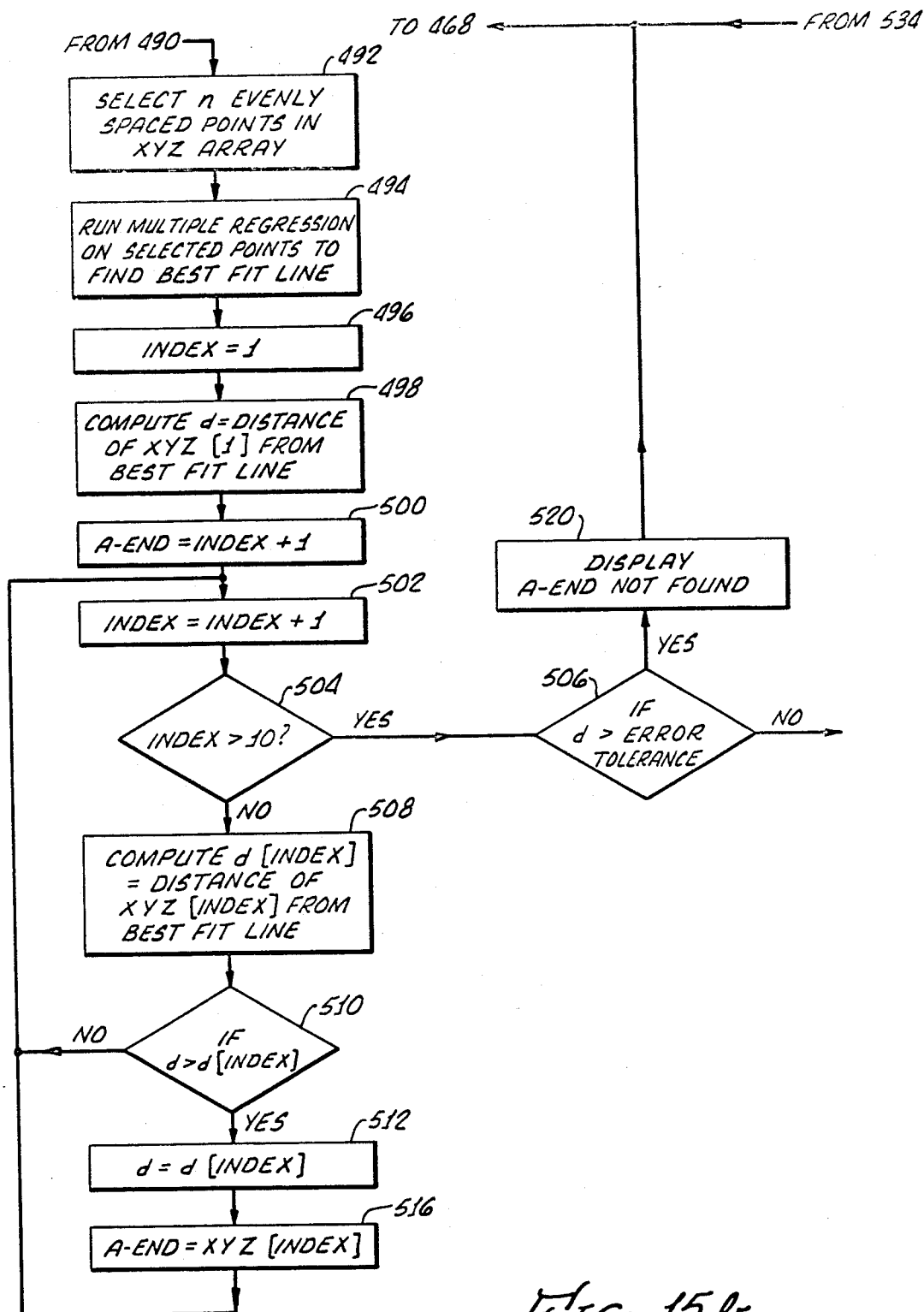
Figure 15C:
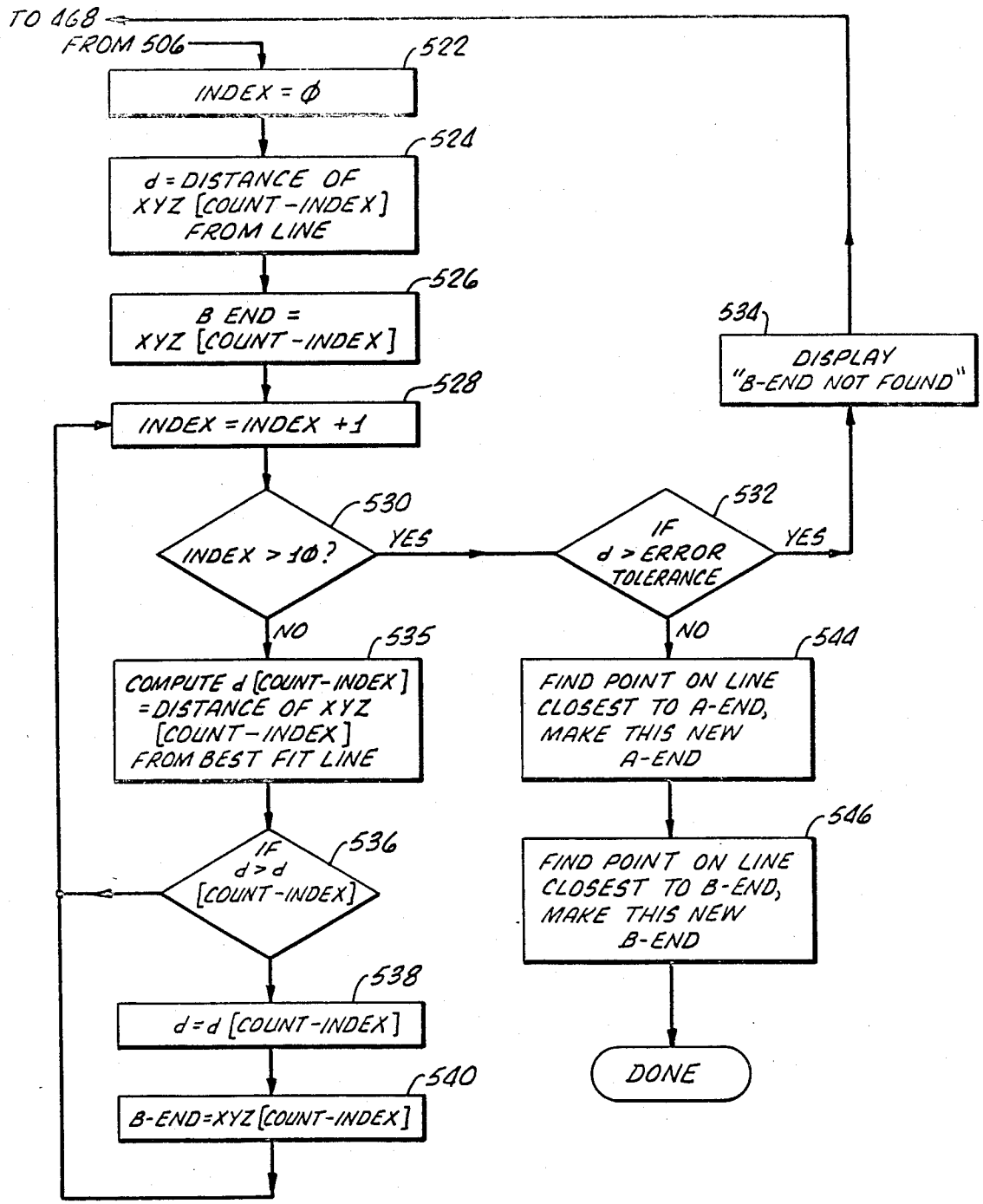

The program routine that implements the scanning mode of a simple straight is explained by the flow charts of FIGS. 15a, 15b and 15c. Since the scanning motion of the optical probe along each pipe straight is preferably a steady unidirectional motion, the first and last points in the coordinate data array of storage 460, for each straight, will be the first and last measured points on the pipe straight that has been scanned. The output of this program routine is two points "A-end" and "B-end", which lie on a best fit centerline of the pipe straight, and thus effectively define, in three dimensions, both position and orientation of the vector of the centerline of such straight.

The flow chart of FIG. 15a further explains the readout computation and storage of coordinates that is functionally illustrated in the block diagram of FIG. 14. Starting in the flow chart at the start symbol, it is first determined whether or not the arming button has been pressed, as at 468. If the arming button has not been pressed, the program returns to the starting point. If it has been pressed, a measured point count is set to 1, as indicated at 470, for the start of the read loop which controls readout and storage of raw data. Readout of the raw data, namely the data from the diode array scanning circuit and also from the encoders, is initiated, as indicated at 472, and the probe data is analyzed in the data quality logic as indicated at 474. If the probe data is not satisfactory, the program returns to the starting point. If satisfactory, the probe data and the encoder data are stored in the raw data storage as indicated at flow chart block 476, and the count of the read loop is augmented, as indicated at 478.

If the augmented count is greater than some selected high number, such as 1,000 counts for example (measurement on more than 1,000 points may introduce undesired redundancy), too much data has been collected, and the program commands "data overrun" to be displayed and returns to the starting point, as indicated at 482. If the count is less than 1,000 and if the arming button remains depressed, as indicated at 484, the loop returns to its start point for the next readout of raw data at box 472 of the flow chart. If the arming button is no longer pressed, and the count is less than 100, as indicated at 486, the program displays the message "insufficient data" (flow chart block 488) and returns to the starting point. If the count is greater than 100 and the arming button is no longer depressed, 100 or more points have been collected, and this is deemed sufficient for a measurement. Thus measurements taken on the first straight are complete. Now the raw data, both encoder and probe scanning data, are converted into X,Y,Z coordinates of individual points, each corresponding to one of the ten millisecond clock pulses from clock 448, and the data are stored in a coordinate data array, all as indicated at box 490.

Now, having read the raw data, having computed coordinates of a large number of points on the pipe centerline, and having stored these coordinates in the coordinate array, the best fit line is determined. This is illustrated in the first part of FIG. 15b of the flow chart. A number, n, of evenly spaced points in the X,Y,Z array is selected (box 492). Assume that a number, n, in the order of 800 to 1,000 points have had their coordinates measured and computed for a given scan of a single straight. A number, such as 50 for example, of such points will be used as a preferred number for determining the best fit line. The program simply selects 50 of the 800 to 1,000 measured points which are more or less evenly spaced. Thus, for 1,000 measured points, by dividing 1,000 by 50, the program selects every 20th measured point of the stored X,Y,Z coordinates. From these selected 50 points a multiple regression sub-routine is run, as indicated at 494, and the best fit line is found. Further details of the manner of finding the best fit line are described below in connection with the flow chart of FIG. 16.

Having the best fit line and coordinates of, for example, fifty points closely spaced to the best fit line, the program proceeds to find the first end point, which is the point 416 of the pipe of FIG. 13. The routine is the same whether the data is derived for a first straight, a last straight, or any intermediate straight. For the first straight, the first end point is the point on the pipe centerline that is at the end of the pipe, and the last end point is where the arming button is released. For an intermediate straight, the first and last end points found by the program are points on the centerline close to the points at which the probe is positioned when the arming button is pressed and released, respectively. For the last straight, the last end point is the point, such as point 418 on the centerline, that is at the end of the pipe, and the first end point is where the arming button is released.

The program goes through its "find the first end point" sub-routine, which will be described presently, in order to account for erroneous probe readings that may occur when the end of the pipe initially enters or leaves the probe sensitive area. At such times it is possible that the probe may be measuring a "corner" of the pipe, or may be measuring an inside edge of the pipe (which may have an open end) and will not be making its measurement upon the continuous cylindrical exterior of the pipe. As mentioned above, such an erroneous reading is more likely to occur if the probe is not carefully oriented relative to the pipe centerline. In the end point determination, a group of the points closest to the beginning of the measurement (for the first end determination) is analyzed to determine the point of the group which is at the smallest distance from the best fit line. If this smallest distance is less than some error tolerance value, such as, for example, 0.03 inches, then the point exhibiting this smallest distance may be used as the end point. On the other hand, if the smallest distance from the best fit line of any of this group of end points is greater than the tolerance error, then it is likely that the end point has not been found, and this is signaled to the operator.

To find the first end point, an index for the first end point loop is set at 1, as indicated at 496 (FIG. 15b) and a distance "d" is computed, which is the distance of the first of this group of end points from the best fit line, as indicated at 498. The first of this group of end points is indicated in the flow chart as X,Y,Z [1], where X,Y,Z are the point coordinates and [1] is the index number of this point. Now, as indicated in box 500, the symbol A-end, which is used to identify the first end point, is given an assigned value of the coordinates of the index point. This enables start of the loop to determine the smallest distance. The index, set to 1 at box 496, is incremented at 502, and then the incremented index is compared to a selected number, such as 10, for example, in box 504, to determine whether or not the routine has looked at all of the points of the group of points selected to be adjacent the end. In the example illustrated in the flow chart, a group of ten points are selected adjacent the end point for first end determination, and the point of the selected ten that is closest to the best fit line is chosen as the first end point. Thus, if the index is greater than 10, the smallest distance yet determined is compared with the error tolerance to determine whether or not this distance is within an acceptable error level, as indicated in decision block 506. After performing the steps of blocks 504 and 506 (if necessary), the distance d[index] of the indexed X,Y,Z point from the best fit line is computed, as in block 508, and then is compared in decision block 510 to determine whether the previously computed distance, d, is greater than the distance of the point of the present index. If the distance of the point of the present index is smaller than the prior distance, this smaller distance is assigned to "d", as in block 512. If not, the loop returns to its start, and further augments the index, as in box 502. Coordinates of the present index point are assigned to end point "A-end", as at box 516, so that "A-end" is the point with the smallest distance yet found at this stage of the loop.

If the decision block 506 finds that the smallest distance is greater than the error tolerance, the program causes a display of the signal "A-end not found", as at block 520. After a smaller "d" is found, the loop returns to the index augmenting block 502, and the loop repeats unless all ten points of the end group have been compared.

After the index exceeds the selected number of the group of points at the end of the pipe and the decision block 506 indicates that the distance is within the error tolerance, the program proceeds to find the second end point, "B-end", of the straight, employing another similar loop. As indicated above, the second end point of each straight is either the last point on the intermediate or first straight at which a measurement is made, or the end of the pipe of the last straight. For the second end point loop (FIG. 15c) the index is set to 0, as in block 522, and the distance between the last point measured and the best fit line is assigned to symbol "d". The last point measured for any straight is the point of the last count, the count being tracked as indicated in the loop beginning with block 470 (FIG. 15a). This last point is X,Y,Z [count−index], where index=0. The coordinates X,Y,Z [count - index] of this last point are assigned to the end point symbol "B-end". The loop begins in block 528 by augmenting the index. In decision block 530 the index is compared to the quantity 10 (the exemplary number of points selected at or near the pipe end or straight measurement end) to see if all ten end points have been evaluated and, if so, to determine whether or not the smallest quantity "d" is greater than the error tolerance, as in decision block 532.

As before, if the index is greater than the selected number of points, and the smallest distance is greater than the error tolerance, the program, causes display of "B-end not found", as in block 534, and returns to the program start. Until the index is greater than 10 the program flows down to the computation block 535 in which the distance d[count−index] is computed as equal to the distance of the present point X,Y,Z [count−index] from the best fit line. After computing the distance of the point of the present index, this newly computed distance is compared with the previous distance of the previous point (block 536), and if the new distance is smaller the distance [count−index] of the present index is assigned to symbol "d", as in block 538. If the present index distance d[count−index] is not less than the previous distance, the program returns to the beginning of this loop, block 528, to again augment the index.

After setting the quantity "d" to the newly discovered smaller distance d[count−index], as in block 538, it is known that the smallest distance yet discovered is the distance of the point X,Y,Z [count−index] from the best fit line. Then, as in block 540, the coordinates X,Y,Z [count−index], are assigned to the quantity "B-end", as indicated in block 540. Now the processing returns to the beginning of the loop, which repeats until the index is greater than 10, as in the previously described loop.

If the index is greater than 10, as in block 530, and the smallest distance is not greater than the error tolerance, as determined by decision block 532, then, as in block 544, the point on the best fit line closest to "A-end" is determined, and this is made the new "A-end" point. Further, as in block 546, a point on the best fit line closest to "B-end" is found, and this is made the new "B-end", at which time the processing for the given straight is completed. Then, if this has not been the last straight, the entire set of processing indicated in flow charts 15a, 15b and 15c is repeated for the next straight.

A multiple regression technique is employed to define the best fit vector or three dimensional line for the selected number of measured points (block 494 of FIG. 15b). The multiple regression technique is a standard mathematical procedure for defining the minimum values of the sum of squared errors, the errors being distances from each of a number of points to a line. It is known that each measured point of the selected group of points along the pipe centerline has three measured coordinates—its X coordinate, its Y coordinate, and its Z coordinate. The multiple regression technique enables a vector to be defined, extending through this group of points in such a way that the sum of the squares of the errors (distance) of each point from that line along two of the specified axes is minimized. That is, a best fit line is defined for which the sum of squares of distances (parallel to each of two axes of the coordinate system) between the line and each point is a minimum. It is not necessary to minimize the sums of squared errors for the errors (distances of the line) parallel to all three axes, because use of errors along only two axes is found to provide adequate precision.

To accomplish this procedure, three vector variables of an equation (see Equation (1) below) defining the best fit line are generated by assigning the X axis measurements to a first variable ($x_1$ for example), the Y axis measurements to a second variable ($x_2$ for example), and the Z axis measurements to a third variable ($x_3$ for example). One of these three variables is assumed to be a dependent variable, and the other two are assumed to be independent variables. In this procedure, the sum of the squared errors parallel to the axes of the two independent variables will be minimized by the multiple regression technique, and this will define the best fit vector. To get the best overall fit, the variable with the largest distance between its maximum and minimum values among the group of measured points is assigned to be the dependent variable. In other words, the maximum variation among all X coordinate measurements, among all Y coordinate measurements, and among all Z coordinate measurements are compared, and the coordinate measurements having the greatest of the three maximum variations is assigned to be the dependent variable.

There is then generated an equation of the form:

$$x_1 = c + ax_2 + bx_3 \qquad \text{(Equation 1)}$$

where c is a constant, $x_1$ is the dependent variable (which may be any one of the X, Y or Z coordinates of a point on the best fit line), and $x_2$ and $x_3$ are the independent variables (the remaining coordinates). This equation describes the vector in the X,Y,Z coordinate system of the measurements. The vector is the best estimate for the centerline of the pipe in this coordinate system, as determined by the multiple point measurements made by the probe during its motion along the scanning path. To define the best fit line it is necessary to define coefficients c, a and b of Equation (1).

The multiple regression technique employs the sum of the squared errors of the two independent variables ($x_2$ and $x_3$), minimizing these sums and yielding the desired coefficients c, a, and b of Equation (1), to thereby define the best fit line in the three dimensional coordinate system.

The procedure to calculate the multiple regression is given below in matrix notation, where $\beta$ denotes the coefficients and $\Sigma$ denotes the summation. A least squares solution to a set of normal equations for the $\beta$ coefficients is expressed as follows:

$$[\Sigma X] \cdot [\beta] = [\Sigma Y] \qquad \text{(Equation 2)}$$

where X and Y ar the two independent variables of Equation (1) with the solution $$[\beta] = [\Sigma X]^{-1} \cdot [\Sigma] \qquad \text{(Equation 3)}$$

where $[\Sigma Y]$ is a column matrix of the sum of squares and crossproducts of Y with X and $[\Sigma X]$ is a matrix of the sums of squares and cross-products of the X's. $\beta$ is the vector of regression coefficients shown as c, a, and b in Equation (1), which is rewritten as:

$$Y = b_0 + b_1 X_1 + b_2 X_2 + e \qquad \text{(Equation 4)}$$

where e is the error term.

The matrix equation given in equation 2 after cross-multiplication, is:

$$\begin{bmatrix} 3 & \Sigma X_1 & \Sigma X_2 \\ \Sigma X_1 & \Sigma X_1^2 & \Sigma X_1 X_2 \\ \Sigma X_2 & \Sigma X_2 X_1 & \Sigma X_2^2 \end{bmatrix} \cdot \begin{bmatrix} b_0 \\ b_1 \\ b_2 \end{bmatrix} = \begin{bmatrix} \Sigma X_0 Y \\ \Sigma X_1 Y \\ \Sigma X_2 Y \end{bmatrix} \qquad \text{(Equation 5)}$$

The coefficients $b_0$, $b_1$ and $b_2$ are found using Equation (3).

The result of the multiple regression yields the coefficients $b_0$, $b_1$ and $b_2$, which are the coefficients c, a, b, respectively, of Equation (1), thereby defining the best fit line.

To translate a measured point to the closest point on the best fit line (blocks 544,546, FIG. 15c), a set of equations employing the coefficients c, a and b determined by the multiple regression routine is set up and solved as follows:

$$X' = (Z-a) - (c \cdot Y/b) \qquad \text{(Equation 6)}$$

$$Y' = (Z-a) - (b \cdot x/c) \qquad \text{(Equation 7)}$$

$$Z' = a + (b \cdot X) + (c \cdot Y) \qquad \text{(Equation 8)}$$

where a, b and c are the coefficients determined in the multiple regression routine, X', Y' and Z' are coordinates of the closest points on the best fit line, and X, Y and Z are the coordinates of the points to be transferred.

An alternative, a trial and error reiterative procedure may be used to define the best fit line. In such a trial and error procedure the sum of squares of the errors of all selected points is determined for each of a number of arbitrarily selected lines, and the best fit line is defined as the line having the smallest sum of squared errors.

The described program and other calculations and operations necessary for operation of the described probe are carried out by a standard digital computer, programmed to carry out the described operations. The computer program selectively calls the sub-program depicted in the flow charts of FIGS. 15a, 15b and 15c, collectively, for each straight of a pipe being measured. Having measured and identified the vectors of the centerlines of the various straights, the computer, as is well knows, may proceed to calculate all of the necessary tube data, including the distance between bends (DBB), the bend angle or degree of bend (DOB) and the plane of bend (POB).

It will be seen that by use of the described scanning mode the optical probe described above will provide measurements of greatly increased accuracy by effectively minimizing random errors inherent in the measuring instrument, including encoder readouts and optical data readouts. The scanning mode also effectively averages out other error sources such as nonuniformity of the exterior of the pipe being measured.

The foregoing detailed description is to be clearly understood as given by way of illustration and example only, the spirit and scope of this invention being limited solely by the appended claims.

I claim:

1. An optical probe comprising:
    a working head,
    first and second mutually spaced light sensors mounted to said working head and having overlapping fields of view,
    a light source spaced from both said sensors and extending across at least a common portion of said overlapping fields of view and positioned to illuminate both such sensors over at least said common portion of said fields of view,
    both said sensors having a section of their fields of view occluded by presence in the overlapping fields of view of an occluding object of which position is to be measured, and
    means responsive to said sensors for generating a set of signals that collectively define position of an occluding object relative to said working head in a reference system fixedly related to the working head.

2. The optical probe of claim 1 wherein said sensors have optical axes lying in a common plane and wherein said light source provides a wide beam of light lying in said common plane.

3. The probe of claim 1 wherein said sensors comprise first and second linear arrays of photosensitive elements, wherein occlusion of sections of the fields of view of the sensors prevents light from said light source from illuminating first and second groups of said light sensitive elements of said first and second arrays respectively, and wherein said means for generating a set of signals comprises means for scanning the elements of said arrays and means responsive to said scanning means for generating signals representing the positions of said groups of elements relative to said respective arrays.

4. The optical probe of claim 1 wherein said working head comprises a body having first and second end portions and an inner portion, said sensors being respectively mounted at said first and second end portions and directed toward said inner portion, said body having a window therein extending around said inner portion toward said end portion, said light source being mounted within said body and including means for projecting light through said window toward said sensors.

5. The optical probe of claim 1 wherein said working head comprises a body having first and second end portions and an inner portion, said sensors being respectively mounted at said inner portion, and including first and second mirrors mounted s in said end portions for reflecting light to said sensors, said body having a window therein extending around said inner portion and facing toward said end portions, said light source being mounted within said body and including means for projecting light through said window toward said mirrors.

6. The optical probe of claim 1 wherein said working head comprises a body having end sections and an inner section, said light source being mounted within said body, window means in said body for passing light from said light source toward said end sections through a sensitive area extending between said end sections and said inner section, said sensors each being mounted to said housing at different portions thereof, and first and second optical means for providing first and second optical paths from said light source to said first and second sensors respectively and for forming on said sensors first and second images of said light source.

7. The optical probe of claim 6 wherein said optical means includes first and second mirrors mounted in said optical paths, respectively, for reflecting light from said light source to said sensors, and first and second lenses positioned in respective ones of said optical paths.

8. The optical probe of claim 6 wherein said light source is mounted within said inner section, said sensors being mounted in said inner section on opposite sides of said light source, said optical means including first and second mirrors mounted in said optical paths respectively for reflecting light from said light source to said mirrors, and first and second lenses positioned in respective ones of said optical paths.

9. A method for measuring position of the centerline of a pipe comprising the steps of:
    providing a working head having an emitting section and first and second mutually spaced receiving sections defining an area of sensitivity between the receiving sections and emitting section,
    projecting light from said working head emitting section through said sensitive area,
    forming images of said projected light at a plurality of first receiving points at said first receiving section and at a plurality of second receiving points at said second receiving section,
    positioning a pipe within said sensitive area, thereby occluding some of the receiving points relative to light projected from said working head toward at least some of said receiving points, and
    generating a set of signals representing positions relative to said working head of those points of said receiving points that are occluded.

10. The method of claim 9 wherein said step of forming images at a plurality of points comprises the step of mounting a linear array of light sensitive elements at said receiving sections respectively, mounting image forming lenses between said light sensitive elements and said emitting section, and including the step of scanning said light sensitive elements to generate a set of signals collectively defining positions within the respective arrays of those elements of the arrays that are occluded by presence of a pipe to be measured within said sensitive area.

11. A method of measuring position of a centerline of a pipe comprising the steps of:
   providing a working head having a sensitive area in which a measurement is to be made,
   providing a light source positioned relative to said working head to illuminate said sensitive area,
   mounting first and second light sensors to said working head and positioned to have overlapping fields of view for reception of light projected from said light source and passing through said sensitive area,
   positioning a pipe of which position is to be measured within said sensitive area, thereby occluding areas of the fields of view of respective light sensors in accordance with position of the pipe within said sensitive area, and
   generating a set of electrical signals defining positions of the occluded areas of each said field of view.

12. The method of claim 11 wherein said working head includes end sections and an intermediate section, said step of providing light sensors comprising the steps of mounting said sensors at respective ones of said end sections and directing the field of view of each said sensor toward said intermediate section, and wherein said step of projecting light from a light source comprises the step of providing a light source in said intermediate section and projecting light from said light source toward the sensors in said end sections.

13. The method of claim 11 wherein said working head includes end sections and an intermediate section, said step of projecting light from a light source comprising the steps of mounting a light source in said intermediate section, projecting light from the light source to first and second mutually spaced remote portions of the working head spaced from the intermediate section, reflecting light from said remote portions of the working head back toward said intermediate section and sensing reflected light at mutually spaced areas of said intermediate section.

14. The method of claim 13 wherein said step of providing a working head includes locating said sensitive area between said end sections and said intermediate section.

15. An optical measuring instrument for measuring bent pipe
   a support,
   a working head,
   an articulated arm mounting the working head to the support for movement about a plurality of mutually angulated axes to diverse positions, and
   means responsive to articulation of said arm for generating a set of signals that collectively define the position of the working head,
   said working head comprising:
      a housing having an intermediate section and first and second end sections, said end sections and intermediate section defining a sensitive area between the end sections adjacent the intermediate section,
      light means mounted to said housing for projecting light across said sensitive area and toward said end sections,
      first and second light sensors mounted to said working head, and
      optical means for providing first and second optical paths extending from said light source across said sensitive area to said end sections and to said sensors.

16. The measuring instrument of claim 15 wherein said sensors are mounted at ends of said respective end sections and comprise arrays of light sensitive elements, and wherein said optical means comprise lens means mounted to said working head between said arrays and said sensitive area.

17. The measuring instrument of claim 15 wherein said optical means comprise means for providing a folded optical path from said light source across the sensitive area to said sensors, said means for providing a folded optical path including first s and second mirrors mounted at respective ends of said end sections for reflecting light from said source to respective ones of said sensors.

18. The measuring instrument of claim 17 wherein said light means are mounted to said intermediate section and wherein said light sensors are mounted to said intermediate section on opposite sides of said light means.

19. An optical measuring probe for measuring position of a bent pipe comprising:
   a housing having leg portions and an intermediate portion, said housing having a body section and a cover section secured thereto, said body section and cover section defining a window extending along said intermediate portion, said leg portions and intermediate portion defining a sensitive area adjacent the intermediate portion and between the leg portions,
   a light source in said housing between said body and cover sections for projecting light through said window and across said sensitive area to said leg portions,
   first and second light sensors mounted in said body section, said sensors having optical axes intersecting within said sensitive area and having fields of view overlapping each other over at least portions of said sensitive area, whereby presence of a pipe to be measured within said sensitive area will occlude portions of the fields of view of said sensors, and
   means responsive to said sensors for generating a set of signals defining positions of occluded portions of the fields of view of said sensors.

20. The optical measuring probe of claim 19 wherein each said sensor comprises a linear array of light sensitive elements, and wherein said light source comprises a strip of light diffusing material mounted to said working head within said housing at said window, said light source including light generating means for illuminating said diffusing material to thereby cause said light source to project light through said diffusing material across said sensitive area.

21. An optical measuring instrument for measuring a bent pipe comprising:
   a support,
   a working head,
   an articulated arm mounting the working head to the support for movement about a plurality of mutually angulated axes to diverse positions, and
   means responsive to articulation of said arm for generating a set of signals that collectively define the position of the working head,
   said working head comprising:
      first and second mutually spaced light sensors mounted to said working head and having overlapping fields of view,
      a light source spaced from both said sensors and extending across at least a common portion of said overlapping fields of view and positioned to illuminate both such sensors over at least said common portion of said fields of view, both said sensors having a section of their fields of view occluded by presence in the overlapping fields of view of an occluding pipe of which position is to be measured, and means responsive to said sensors for generating a set of signals that collectively define position of an occluding pipe relative to said working head in a reference system fixedly related to the working head 22. An optical probe comprising: a working head having light emitting and light receiving sections spaced from one another to define a sensitive area between the sections, said sensitive area being adapted to receive an object to be measured, first and second mutually spaced light sensors mounted to said light receiving section and having mutually overlapping fields of view directed across said sensitive area toward said light emitting section, light emitting means mounted to said light emitting section for projecting light across said sensitive area toward said light receiving section, and optical means for forming first and second images of said light emitting means on said first and second sensors respectively.

23. An optical measuring instrument for measuring long, slender objects comprising:

a support, a working head, an articulated arm mounting the working head to the support for movement about a plurality of mutually angulated axes to diverse positions, and means responsive to articulation of said arm for generating a set of signals that collectively define the position of the working head, said working head comprising:

a housing having an intermediate section and first and second end sections, said end sections and intermediate sections defining a sensitive area between the end sections adjacent the intermediate section, light means mounted to the housing in the intermediate section for projecting light across said sensitive area toward said end sections, first and second light sensors mounted to the working head in said intermediate section and on opposite sides of said light means, first and second reflector means mounted to the end sections for receiving light from said light source and reflecting light to said light sensors, and lens means mounted in the housing between said reflector means and light sensors.

24. The instrument of claim 23 wherein said intermediate section includes means defining an electronics chamber and means defining a light source chamber at a forward portion of said electronics chamber, said light sensor being mounted within said electronics chamber on opposite sides of said light source chamber, said light chamber including an opening facing forwardly toward said end sections, and a light diffusing plate closing said opening.

25. The instrument of claim 24 wherein said housing is substantially U-shaped, having first and second leg sections interconnected by said intermediate section, said first and second end sections forming free ends of said leg sections, and each said leg section having a light receiving window extending from a free end thereof for a major portion of the length of the leg section.

26. A measurement instrument comprising:

a support, a probe, including means for sensing position of an object relative to said probe, an articulated arm mounting the probe to the support for movement with components of rotation about a plurality of mutually angulated axes, means on said articulated arm and probe for generating sets of signals that collectively define three dimensional coordinates of a point on an object positioned to be sensed by said probe, said probe being adapted to move in a scanning path relative to an object to be measured, means for repetitively sampling said sets of signals at successive points along said scanning path, and means responsive to said sampled sets for computing coordinate data sets representing measured coordinates of a plurality of points on an object to be measured, whereby a line having a predetermined relation to said object is defined by said plurality of points.

27. The instrument of claim 26 including means for selecting a best fit line through said coordinate data sets, and means for defining said best fit line in three dimensions.

28. The instrument of claim 26 wherein said means for sensing position comprises a probe body having a sensitive area adapted to receive an object of which position is to be measured, means on the probe body for projecting light across said sensitive area, and light sensor means on the probe body for receiving light projected across said sensitive area.

29. The instrument of claim 26 wherein said means for generating sets of signals comprises means for enabling repetitive readout of said sets of signals during motion of the probe along at least a portion of said scanning path.

30. The instrument of claim 26 wherein said means for sampling comprises means for reading out sets of signals at substantially evenly spaced points along said scanning path.

31. The instrument of claim 26 wherein the object is a pipe section of which the centerline is to be measured in three dimensions, said probe having a sensitive area, said scanning path being substantially parallel to said pipe section, said pipe moving through said sensitive area during motion of the probe in said scanning path.

32. The instrument of claim 26 wherein the number of points at which the sets of signals are sampled is not less than about fifty.

33. The instrument of claim 26 including means for selecting a first end group of said computed coordinate data sets representing coordinates of an end group of points adjacent a first end of said scanning path, means for determining the smallest distance between points of said end group and said best fit line, and means for comparing said smallest distance with a predetermined error distance so as to determine whether or not an end of said object has been found.

34. A method of measuring direction of a line having a known angular relation to an object comprising the steps of:

moving a probe in a scan path along the object by angularly displacing the probe about a plurality of axes of rotation, generating sets of signals as the probe is moved in said scan path, each said set of signals defining coordinates of a point on the line, repetitively sampling said sets of signals, and computing coordinates of a plurality of mutually spaced measured points on the line from said sample sets of signals, whereby a best fit line may be selected from said mutually spaced measured points.

35. The method of claim 34 wherein each of said sets of signals comprises a probe position set of angular position signals representing angular displacements of the probe about each of said axes, and a point position set of signals representing position of a point on an object relative to the probe.

36. The method of claim 34 wherein said step of generating sets of signals comprises the steps of providing a sensor probe having an emitting section and first and second mutually spaced receiving sections defining a sensitive area between the receiving sections and the emitting section, projecting light from said emitting section through said sensitive area, forming images of said projected light at a plurality of first receiving points at said first receiving section and at a plurality of second receiving points at said second receiving section, positioning an object to be measured within said sensitive area, thereby occluding some of the receiving points relative to light projected from said emitting section toward at least some of said receiving points, and generating a set of point position signals representing positions relative to said probe of those points of said receiving section that are occluded.

37. The method of claim 34 wherein said step of moving the probe in a scan path comprises moving the probe in a scan pat that starts from a point displaced from an end of the object and continues through points adjacent the ends of the object, and selecting a point on said best fit line that represents the end of the object.

38. The method of claim 37 wherein the step of selecting a point that represents the end of the object comprises the steps of selecting a group of sampled measured points adjacent the end of the object, selecting the measured point of said group having the smallest displacement from said best fit line, and comparing said smallest displacement with a predetermined value to determine whether or not an end point has been found.

39. The method of claim 37 wherein said step of generating sets of signals comprises the steps of providing a probe having a sensitive area in which a measurement is to be made, providing a light source positioned relative to said working head to illuminate said sensitive area, mounting first and second light sensors to said probe and positioned to have overlapping fields of view for reception of light projected from said light source and passing through said sensitive area, positioning a pipe of which position is to be measured within said sensitive area, thereby occluding areas of the fields of view of respective light sensors in accordance with position of the pipe within said sensitive area, and generating a set of electrical signals defining positions of the occluded areas of each said field of view.

40. The method of claim 39 wherein said probe includes end sections and an intermediate section, said step of providing light sensors comprising the steps of mounting said sensors at respective ones of said end sections and directing the field of view of each said sensor toward said intermediate section, and wherein said step of projecting light from a light source comprises the step of providing a light source in said intermediate section and projecting light from said light source toward the sensors in said end sections.

41. A method of measuring direction of the centerline of a pipe comprising the steps of:

moving a measuring probe in a scan path along and in proximity to a length of a pipe to be measured, employing the probe to measure position of each of a plurality of points on said centerline during motion of the probe in said scan path, selecting measured positions of a group of said points, and defining a best fit line for the measured positions of the points of said group.

42. The method of claim 41 wherein said step of employing said probe comprises generating a set of probe position signals at each of said points, each said set of probe position signals collectively defining a position of said probe, and generating a set of pipe position signals at each of said points, each said set of pipe position signals collectively defining position of the pipe centerline relative to the probe.

43. The method of claim 42 wherein said step of moving comprises angularly displacing the probe about a plurality of axes, thereby translating and rotating the probe to follow said scan path, and wherein said step of generating a set of probe position signals comprises generating signals indicative of angular displacements of said probe about each of said axes.

44. The method of claim 42 wherein said step of generating a set of pipe position signals comprises illuminating said pipe with light projected from the probe, receiving said projected light at spaced areas of the probe, positioning a pipe relative to the probe to occlude a portion of the projected light, and generating signals indicative of positions of said occluded portion.

45. The method of claim 41 wherein said step of moving comprises moving the probe from a starting position displaced from the pipe relative to and past one end of the pipe, and selecting one of said points on the centerline of the pipe at said end of the pipe.

46. The method of claim 45 wherein said step of selecting one of said points comprises selecting a group of said points adjacent the end of the pipe, identifying that one of said selected group that is spaced from said best fit line by the smallest distance of the selected group, and comparing said smallest distance to a tolerance distance.

47. The method of claim 42 wherein said step of generating a set of pipe position signals comprises the steps of providing said measuring probe with sensitive area in which a measurement is to be made, providing a light source on the probe to s illuminate said sensitive area, mounting first and second light sensors to said probe and positioned to have overlapping fields of view for reception of light projected from said light source and passing through said sensitive area, positioning a pipe of which position is to be measured within said sensitive area, thereby occluding areas of the fields of view of respective light sensors in accordance with position of the pipe within said sensitive area, and generating a set of electrical signals defining positions of the occluded areas of each said field of view.

48. The method of claim 47 wherein said probe includes end sections and an intermediate section, said step of providing light sensors comprising the steps of mounting said sensors at respective ones of said end sections and directing the field of view of each said sensor toward said intermediate section, and wherein said step of projecting light from a light source comprises the step of providing a light source in said intermediate section and projecting light from said light source toward the sensors in said end sections.

49. A method of measuring centerline of a pipe section in three dimensions employing an optical position sensing probe having a sensitive area, said method comprising the steps of:

moving the probe in a scanning path along the pipe section to cause a length of the pipe section to move through the probe sensitive area, generating sets of signals as the length of pipe section moves through the probe sensitive area, each said set of signals defining three dimensional coordinates of a different point on the centerline of the pipe section, and reading out said sets of signals at a plurality of different points along said scanning path, whereby three dimensional coordinates of a plurality of points on the centerline of the pipe may be computed from said sets of signals to thereby define the pipe centerline in three dimensions.

50. The method of claim 49 including the step of defining a best fit line for at least a number of said points.

51. The method of claim 49 wherein said sets of signals are read out at not less than about ten points.

52. The method of claim 49 including the steps of selecting an end point from said plurality of points, and determining if said end point is within a selected distance of the pipe centerline.

53. The method of claim 49 including the steps of selecting a group of points adjacent an end of the pipe section and selecting from among said group a minimum distance point having the smallest distance to said pipe centerline, thereby defining an end point of the pipe centerline.

* * * * *